(12) United States Patent
Weber et al.

(10) Patent No.: US 8,660,905 B2
(45) Date of Patent: Feb. 25, 2014

(54) METHOD AND SYSTEM FOR VALIDATING PROCESS MODELS

(75) Inventors: Ingo Weber, Mannheim (DE); Ulrich Benz, Karlsdorf (DE)

(73) Assignee: SAP AG, Walldorf (DE)

( * ) Notice: Subject to any disclaimer, the term of this patent is extended or adjusted under 35 U.S.C. 154(b) by 1286 days.

(21) Appl. No.: 11/932,730

(22) Filed: Oct. 31, 2007

(65) Prior Publication Data

US 2009/0113394 A1    Apr. 30, 2009

(51) Int. Cl.
*G06Q 30/00* (2012.01)

(52) U.S. Cl.
USPC .......................................................... 705/26.1

(58) Field of Classification Search
USPC .................................................. 705/26–27.2
See application file for complete search history.

(56) References Cited

U.S. PATENT DOCUMENTS

| | | | | |
|---|---|---|---|---|
| 5,394,347 | A * | 2/1995 | Kita et al. ........................ | 703/2 |
| 6,314,434 | B1 | 11/2001 | Shigemi et al. | |
| 6,577,981 | B1 | 6/2003 | Grey et al. | |
| 7,882,057 | B1 | 2/2011 | Little et al. | |
| 2006/0053039 | A1 | 3/2006 | Gamarnik et al. | |
| 2006/0212836 | A1 * | 9/2006 | Khushraj et al. .............. | 715/866 |
| 2007/0094060 | A1 | 4/2007 | Apps et al. | |
| 2007/0094211 | A1 * | 4/2007 | Sun et al. ........................ | 706/50 |
| 2007/0150322 | A1 | 6/2007 | Falchuk et al. | |
| 2007/0208590 | A1 | 9/2007 | Dorricott et al. | |
| 2007/0219941 | A1 | 9/2007 | Schnurr et al. | |
| 2007/0245295 | A1 | 10/2007 | Baum | |
| 2008/0229275 | A1 | 9/2008 | Weber | |
| 2010/0114586 | A1 | 5/2010 | Barros et al. | |

OTHER PUBLICATIONS

Ankolekar et al, "Towards a Formal Verification of OWL-S: Process Models", In Fourth International Semantic Web Conference, 2005, 15 pages.
Awad et al, "Efficient Compliance Checking Using BPMN-Q and Temporal Logic", Proceedings of the Sixth International Conference on Business Process Management (2008), pp. 326-341.
Brat et al,"Combining Static Analysis and Model Checking for Software Analysis", 16th IEEE International Conference on Automated Software Engineering (2001), 8 pages.
Fisteus et al, "Applying Model Checking to BPEL4WS Business Collaborations", Proceedings of the ACM Symposium on Applied Computing (2005), pp. 826-830.
Fu, et al, "Analysis of Interacting BPEL Web Services", Proceedings of the 13th International Conference on World Wide Web (2004), pp. 621-630.

(Continued)

*Primary Examiner* — Jeffrey A Smith
*Assistant Examiner* — Ethan D Civan
(74) *Attorney, Agent, or Firm* — Brake Hughes Bellermann LLP

(57) ABSTRACT

A method and system are described for validating process models. A process semantic model including a semantic directed graph including nodes associated with tasks and edges associated with a direction of flow of execution of the tasks may be obtained. Edges entering nodes include annotations including precondition semantic indicators associated with the entering edges and edges exiting nodes include annotations including postcondition semantic indicators associated with the exiting edges. The process semantic model may be traversed to determine a flow of execution of activities associated with the tasks based on visiting the nodes based on a depth-first traversal. A validity of execution associated with a flow of execution of the activities associated with the tasks may be determined based on checking a validity of execution status based on a semantic processing of one or more semantic annotation indicators associated with the precondition semantic indicators and the postcondition semantic indicators.

11 Claims, 19 Drawing Sheets

(56) References Cited

OTHER PUBLICATIONS

Fuxman, A. D., "Formal Analysis of Early Requirements Specifications", 2001, 113 pages.
Godefroid, P., "Partial-Order Methods for the Verification of Concurrent Systems: An Approach to the State-Explosion Problem", Springer-Verlag New York, Inc., (1996), pp. 1-134.
Janssen et al., "Verifying Business Processes using SPIN", Proceedings of the 4th International SPIN Workshop (1998), pp. 21-36.
Kovalyov et al., "A Polynomial Algorithm to Compute the Concurrency Relation of Free-choice Signal Transition Graphs", In Proceedings of the International Workshop on Discrete Event Systems, vol. 1 (1995), 13 pages.
Kazhamiakin et al., "Formal Verification of Requirements using SPIN: A Case Study on Web Services", Proceedings of the Second International Conference on Software Engineering and Formal Methods (2004), pp. 406-415.
Liu et al., "A Static Compliance Checking Framework for Business Process Models", IBM Systems Journal, vol. 46, Issue 2 (2007), 34 pages.
McMillan, K. L., "Symbolic Model Checking: An Approach to the State Explosion Problem", PhD Thesis (May 1992), pp. 1-212.
Nakajima, S., "Verification of Web Service Flows With Model-Checking Techniques", Proceedings of First International Symposium on Cyber Worlds (2002), pp. 378-385.
Narayanan et al., "Simulation, Verification and Automated Composition of Web Services", Proceedings of the 11th International Conference on World Wide Web (2002), pp. 77-88.
Ribeiro et al., "Translating Synchronous Petri Nets into PROMELA for Verifying Behavioural Properties", International Symposium on Industrial Embedded Systems (2007), pp. 266-273.
van der Aalst, W.M.P, "Verification of Workflow Nets", Proceedings of the 18th International Conference on Application and Theory of Petri Nets, LNCS vol. 1248 (1997), 21 pages.
van der Aalst, W.M.P., et al, "Workflow Patterns", Distributed and Parallel Databases, vol. 14, No. 1 (Jul. 2003), 70 pages.
Vanhatalo et al., "The Refined Process Structure Tree", Proceedings of the 6th International Conference on Business Process Management, LNCS vol. 5240 (Sep. 2008), pp. 100-115.
Vanhatalo et al., "Faster and More Focused Control-Flow Analysis for Business Process Models Through SESE Decomposition", Proceedings of the 5th international conference on Service-Oriented Computing, LNCS vol. 4749 (2007), 17 pages.
Vaz et al., "Towards Automated Verification of Web Services", International Association for Development of the Information Society (IADIS) International Conference (Oct. 2007), 9 pages.
Verbeek et al., "Diagnosing Workflow Processes Using Woflan", The Computer Journal, vol. 44 (2001), 34 pages.
Weber et al., "Beyond Soundness: On the Semantic Consistency of Executable Process Models", In Sixth IEEE European Conference on Web Services (2008), pp. 102-111.
Winslett, M., "Reasoning About Action Using a Possible Models Approach", In Seventh National Conference on Artificial Intelligence (1988), pp. 89-93.
Xiangpeng et al., "Towards the Formal Model and Verification of Web Service Choreography Description Language", Third International Workshop on Web Services and Formal Methods (2006), pp. 1-16.
Bonatti, P., et al, "Rule-based Policy Specification: State of the Art and Future Work", REWERSE Project No. IST-2004-506779 (Sep. 4, 2004), 172 pages.
Ly, L. T., et al, "Semantic Correctness in Adaptive Process Management System", LNCS vol. 4102 (2006), pp. 193-208.
Radwan, et al., "Designing an Integrated Enterprise Model to support Partnerships in the Geo-Information Industry", Partnerships in the Geo-Information IndustryMapAsia, Retrieved on Mar. 9, 2010 from http://www.gisdevelopment.net/technology/gis/ma03111pf.htm, 2003, 11 pages.
Ricciuti, Mike, "Salesforce buy extends reach to mobile devices", CNET News, document retrieved from <http://news.cnet.com/Salesforce-buy-extends-reach-to-mobile-devices/2100-1017_3-6059716.html> on Mar. 19, 2010, 1 page.
Wainewright, Phil "How is AppExchange really doing?", Software as Services, ZDNet.com, Document retrieved from <http://blogs.zdnet.com/SAAS/?p=324> on Mar. 19, 2010, pp. 1-3.
Weber, Ingo et al., "Semantic Business Process Validation", 3rd International Workshop on Semantic Business Process Management, (2008), 36 pages.
Drumm, Christian et al., "Semantics Utilized for Process management within and between Enterprises", SUPER Deliverable D3.2: Dynamic Composition Reasoning Framework and Prototype, Project IST 026850, Sep. 2007, 222 pages.
Extended European Search Report for EP Application No. 09013749.8, mailed on Feb. 8, 2010, 7 pages.
"Statement in accordance with the Notice from the European Patent Office dated Oct. 1, 2007 concerning business methods", Nov. 1, 2007, pp. 589-592.
"StrikeIron: Accurate Data. Right When You Need It.", Document retrieved from <http://www.strikeiron.com/Home.aspx> on Mar. 19, 2010, 3 pages.
"StrikeIron, Inc.", WebServices.Org., Document retrieved from <http://www.webservices.org/vendors/strikeiron_inc> on Mar. 19, 2010,1 page.
"Security Review: Force.com AppExchange Security Review", Document retrieved from <http://wiki.developerforce.com/index.php/Security_Review> on Mar. 19, 2010, 2 pages.
"CRM Company Information—salesforce.com", Salesforce.com, document retrieved from <http://www.salesforce.com/company/> on Mar. 19, 2010, 1 page.
Office Action for EP Application No. 09013749.8, mailed on Feb. 15, 2011, 5 pages.
Roman, "WSMO Choreography: From Abstract State Machines to Concurrent Transaction Logic", ESWC 2008, LNCS vol. 5021, Jun. 2008, pp. 659-673.
Office Action for U.S. Appl. No. 12/263,450, mailed on Jun. 27, 2011, 22 pages.
Mendling, "Detection and Prediction of Errors in EPC Business Process Models", Dissertation, Institute of Information Systems and New Media, Vienna University of Economics and Business Administration, May 22, 2007, 362 pages.
Non-Final Office Action for U.S. Appl. No. 12/263,450, mailed Oct. 9, 2012, 25 pages.
BSI, "Business Continuity Management—Part 1: Code of Practice (BS ISO)", ICS 03.100.01, British Standards Institution, 2006, 50 pages.
Object Management Group, "Business Process Modeling Notation Specification", Final Adopted Specification, Version 1.0, Feb. 2006, 308 pages.
van der Aalst, et al, "YAWL: yet another workflow language", Information Systems, vol. 30, No. 4, 2005, pp. 245-275.
Wijnia, et al, "Assessing Business Continuity Risks in IT", 2007 IEEE International Conference on Systems, Man and Cybernetics, Feb. 28, 2007, pp. 3547-3553.
Non-Final Office Action for U.S. Appl. No. 12/570,828, mailed Apr. 25, 2013, 30 pages.
Non-Final Office Action for U.S. Appl. No. 12/263,450, mailed Aug. 23, 2013, 17 pages.
Result of Consultation for EP Application No. 09013749.8, mailed May 29, 2013, 5 pages.
Weber, et al, "Approximate Compliance Checking for Annotated Process Models", Proceedings of the 1st International Workshop on Governance, Risk and Compliance—Applications in Information Systems, Jun. 17, 2008, pp. 46-60.

\* cited by examiner

2200

X-Axis ->

Y-Axis
↓

| X |   |   |   | X | X | X |
|---|---|---|---|---|---|---|
|   | X |   |   | X | X | X |
|   |   | X |   | X | X | X |
|   |   |   | X | X | X | X |
| X | X | X | X | X |   |   |
| X | X | X | X |   | X |   |
| X | X | X | X |   |   | X |

| | Precondition | Postcondition |
|---|---|---|
| Task A | car available | car rented |
| Task B | car rented, locationIsX | locationIsY NOT locationIsX |
| Task C | car rented, locationIsY | car returned |

METHOD AND SYSTEM FOR VALIDATING PROCESS MODELS

TECHNICAL FIELD

This description relates to techniques for validating process models.

BACKGROUND

With the growth of information technology (IT) industries, companies have increasing needs to manage processes such as their business processes as easily as possible based on covering activities in company processes by software. For example, a company may investigate business process models for tasks that may be replaced or emulated by computer programs. Such business process models may include scalable software fragments that may be reusable and easy to access. For example, Web services may be used to cover as many parts of a process model as possible. For example, software developers may investigate models generated by business experts using a Service Oriented Design principle.

By using loosely coupled web services, such as supported by Service Oriented Architecture (SOA) designs, developers may design software which is flexible and reusable, and which may be easily adapted to varying user needs within short time frames and without great effort in term of costs and manpower.

Many users such as businesses and companies use business process models to represent behavior that is used to solve specific problems that may occur repeatedly or on regular basis. Thus, a problem may be decomposed into smaller sub-problems or atoms, each fulfilling a task that may help to achieve an overall goal. An example business process model may include modeled activities that may be located relative to each other in the model via directed edges. This technique may be combined with a Service Oriented Architecture design by using web services to fulfill the specific tasks of a process model that may provide the desired outcome of a process, for example, via an executable process model. Changes in process models or requirement changes may then be realized by adding new processes, or extending functionality of existing processes.

Software developers currently may be asked to transform business process models into executable programs, wherein composed web services may replace a stationary approach, in which a program may have previously been developed to run on only one server, not reusing or enacting networked services. However, the software developer may experience some difficulties in correctly transforming a model designed by a business expert into an executable business process. For example, a software developer may have a completely different view of the approach, lacking background knowledge that may be helpful to perform a desired task, whereas a business process model designer may not model a formally correct process model, wherein all activities may be reached and wherein executions of the process model may not reach unintended halts. Generally, a software developer may lack business knowledge and a business expert may lack a proper IT background, which may lead to process models that may be inefficient in execution, and which may lead to semantically or formally erroneous process model execution approaches. Thus, it may be desirable to automatically transform a business process model generated by a business expert into an executable model, accounting for all information given by the modeler.

However, it may be difficult to determine whether serial or parallel execution of activities included in such process models will produce valid results. Thus, it may be desirable to provide techniques for validating process models.

SUMMARY

According to one general aspect, a system includes a process semantic model validation engine including a semantic model input manager configured to obtain a process semantic model including a semantic directed graph including nodes associated with tasks and edges associated with a direction of flow of execution of the tasks, wherein edges entering nodes include annotations including precondition semantic indicators associated with the edges entering the nodes and edges exiting nodes include annotations including postcondition semantic indicators associated with the edges exiting the nodes. The process semantic model validation engine further includes a semantic model traversal manager configured to traverse the process semantic model to determine a flow of execution of activities associated with the tasks based on visiting the nodes based on a depth-first traversal. The process semantic model validation engine further includes a semantic model validity manager configured to determine a validity of execution associated with a flow of execution of the activities associated with the tasks based on checking a validity of execution status based on a semantic processing of one or more semantic annotation indicators associated with the precondition semantic indicators and the postcondition semantic indicators.

According to another aspect, a system includes a process state model validation engine including a state model input manager configured to obtain a process state model including a state directed graph including nodes associated with tasks and edges associated with a direction of flow of execution of the tasks, wherein edges entering nodes include state annotations including state precondition indicators indicating state values associated with the edges entering the nodes and edges exiting nodes include state annotations including state postcondition indicators indicating state values associated with the edges exiting the nodes. The process state model validation engine further includes a state model traversal manager configured to traverse the process state model to determine a flow of execution of activities associated with the tasks, the traversing the process state model including performing logical operations on state annotation values associated with the state annotations based on an ordering of the flow of execution. The process state model validation engine further includes a state model validity manager configured to determine a validity of execution associated with a flow of execution of the activities associated with the tasks based on the traversing the process state model.

According to another aspect, a method includes obtaining a process semantic model including a semantic directed graph including nodes associated with tasks and edges associated with a direction of flow of execution of the tasks, wherein edges entering nodes include annotations including precondition semantic indicators associated with the edges entering the nodes and edges exiting nodes include annotations including postcondition semantic indicators associated with the edges exiting the nodes. The process semantic model may be traversed to determine a flow of execution of activities associated with the tasks based on visiting the nodes based on a depth-first traversal. A validity of execution associated with a flow of execution of the activities associated with the tasks may be determined based on checking a validity of execution status based on a semantic processing of one or more semantic annotation indicators associated with the precondition semantic indicators and the postcondition semantic indicators.

According to another aspect, a method includes obtaining a process state model including a state directed graph including nodes associated with tasks and edges associated with a direction of flow of execution of the tasks, wherein edges entering nodes include state annotations including state precondition indicators indicating state values associated with the edges entering the nodes and edges exiting nodes include state annotations including state postcondition indicators indicating state values associated with the edges exiting the nodes. The process state model may be traversed to determine a flow of execution of activities associated with the tasks, the traversing the process state model including performing logical operations on state annotation values associated with the state annotations based on an ordering of the flow of execution. A validity of execution associated with a flow of execution of the activities associated with the tasks may be determined based on the traversing the process state model.

According to yet another aspect, a computer program product is tangibly embodied on a computer-readable medium and is configured to cause a data processing apparatus to obtain a process semantic model including a semantic directed graph including nodes associated with tasks and edges associated with a direction of flow of execution of the tasks, wherein edges entering nodes include annotations including precondition semantic indicators associated with the edges entering the nodes and edges exiting nodes include annotations including postcondition semantic indicators associated with the edges exiting the nodes; traverse the process semantic model to determine a flow of execution of activities associated with the tasks based on visiting the nodes based on a depth-first traversal; and determine a validity of execution associated with a flow of execution of the activities associated with the tasks based on checking a validity of execution status based on a semantic processing of one or more semantic annotation indicators associated with the precondition semantic indicators and the postcondition semantic indicators.

The details of one or more implementations are set forth in the accompanying drawings and the description below. Other features will be apparent from the description and drawings, and from the claims.

BRIEF DESCRIPTION OF THE DRAWINGS

FIGS. 22a-22b illustrate the matrix depicted in FIG. 17 extended with new paths according to an example embodiment.

FIG. 26 illustrates the matrix of FIG. 25 with new rows added according to an example embodiment.

FIG. 26 illustrates the matrix of FIG. 26 with a new row added according to an example embodiment.

FIG. 28 depicts a table illustrating preconditions and postconditions associated with the sequence structure of FIG. 11 according to an example embodiment.

DETAILED DESCRIPTION

Figure 1:
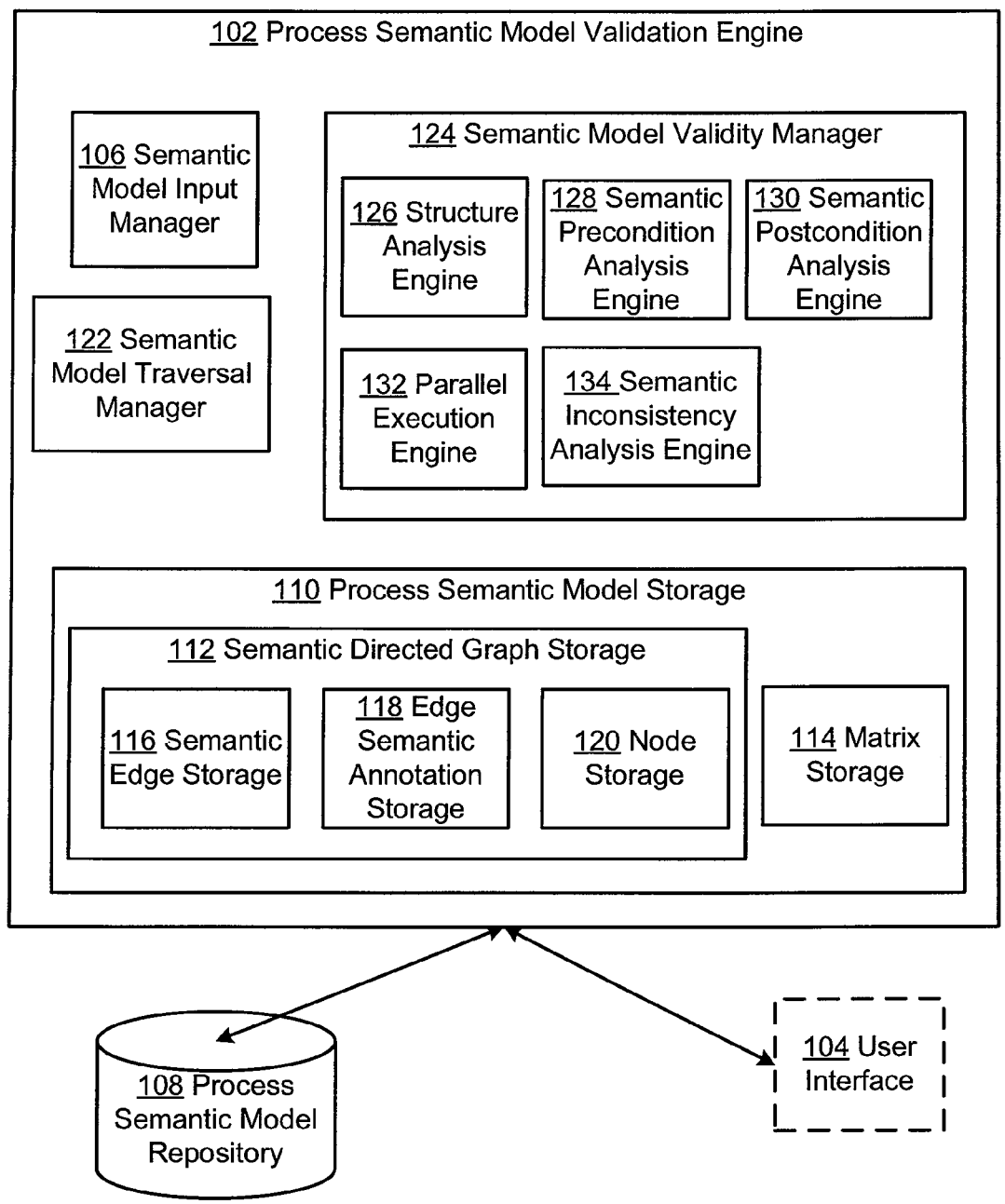
FIG. 1 is a block diagram of an example system for validating process semantic models according to an example embodiment.

FIG. 1 is a block diagram of a system 100 for validating process models, for example, business process models. In the example of FIG. 1, a process semantic model validation engine 102 includes various processing engines that provide and process models that may be displayed, for example, for users via a user interface 104. For example, the user may view via a graphical user interface process models to determine validity of execution of tasks represented by the process models.

The process semantic model validation engine 102 may include a semantic model input manager 106 configured to obtain a process semantic model including a semantic directed graph including nodes associated with tasks and edges associated with a direction of flow of execution of the tasks, wherein edges entering nodes include annotations including precondition semantic indicators associated with the edges entering the nodes and edges exiting nodes include annotations including postcondition semantic indicators associated with the edges exiting the nodes. For example, the semantic model input manager 106 may obtain the process semantic model from a process semantic model repository 108 configured to store process semantic models such as business process models. According to an example embodiment, the process semantic model may include a model associated with web services. According to an example embodiment, the web services may include semantic web services.

According to an example embodiment, the process semantic model validation engine 102 may include a process semantic model storage area 110 configured to store information associated with the process semantic model obtained by the process semantic model validation engine 102. According to an example embodiment, the process semantic model storage area 110 may include a semantic directed graph storage area 112 configured to store information associated with the semantic directed graph, and a matrix storage area 114 configured to store information associated with a matrix associated with the semantic directed graph.

According to an example embodiment, the semantic directed graph storage area 112 may include a semantic edge storage area 116 configured to store information associated with the edges, an edge semantic annotation storage area 118 configured to store information associated with the edge annotations, and a node storage area 120 configured to store information associated with the nodes.

According to an example embodiment, the process semantic model validation engine 102 may include a semantic model traversal manager 122 configured to traverse the process semantic model to determine a flow of execution of activities associated with the tasks based on visiting the nodes based on a depth-first traversal.

According to an example embodiment, workflow structures included in the semantic directed graph may include one or more of a parallel execution workflow structure, a sequential execution workflow structure, a split execution workflow structure, or a merge execution structure. One skilled in the art of data processing may appreciate that many other types of workflow structures may also be included. According to an example embodiment, paths included in the semantic directed graph may include a logical sequence of a group of the activities and a list of indicators associated with preconditions and postconditions associated with the group of activities.

According to an example embodiment, the process semantic model validation engine 102 may include a semantic model validity manager 124 configured to determine a validity of execution associated with a flow of execution of the activities associated with the tasks based on checking a validity of execution status based on a semantic processing of one or more semantic annotation indicators associated with the precondition semantic indicators and the postcondition semantic indicators.

According to an example embodiment, the semantic model traversal manager 122 may be further configured to determine a checking indicator indicating a checking relationship between each traversed path and previously traversed paths included in workflow structures included in the semantic directed graph, wherein each traversed path and each previously traversed path includes one or more nodes included in the semantic directed graph. For each traversed path, a list of semantic annotation indicators associated with the precondition semantic indicators and the postcondition indicators associated with the each traversed path may be generated. The checking indicator may be stored in a matrix that includes rows associated with the paths included in the workflow structures included in the semantic directed graph.

According to an example embodiment, the semantic model validity manager 124 may be further configured to determine the validity of execution based on determining the validity of execution associated with a flow of execution of the activities associated with the tasks based on checking a validity of execution status based on the checking indicators stored in the matrix and a semantic processing of the semantic annotation indicators included in one or more of the lists of semantic annotation indicators.

According to an example embodiment, the semantic model validity manager 124 may include a structure analysis engine 126 configured to determine that a first and second one of the nodes are included in a parallel execution structure included in the workflow structures.

According to an example embodiment, the semantic model validity manager 124 may include a semantic precondition analysis engine 128 configured to determine, for the first one of the nodes, whether first precondition semantic indicators associated with a first edge entering the first one indicate one or more positive values indicating a positive validity of execution of activities associated with the tasks associated with the first one.

According to an example embodiment, the semantic precondition analysis engine 128 may be configured to determine, for a first one of the nodes, whether first precondition semantic indicators associated with a first edge entering the first one indicate one or more positive values indicating a positive validity of execution of activities associated with the tasks associated with the first one.

According to an example embodiment, the semantic model validity manager 124 may include a semantic postcondition analysis engine 130 configured to determine, for the second one of the nodes, whether first postcondition semantic indicators associated with a second edge exiting the second one indicate one or more positive values indicating a positive validity of execution of activities associated with the tasks associated with the second one.

According to an example embodiment, the semantic model validity manager 124 may include a parallel execution engine 132 configured to determine a validity of parallel execution of tasks included in the parallel execution structure based on results determined by the semantic precondition analysis engine 128 and the semantic postcondition analysis engine 130.

According to an example embodiment, the semantic model validity manager 124 may include a semantic inconsistency analysis engine 134 configured to determine one or more semantic inconsistencies associated with a flow of execution of the activities associated with the tasks based on the traversing the process semantic model.

Figure 2:
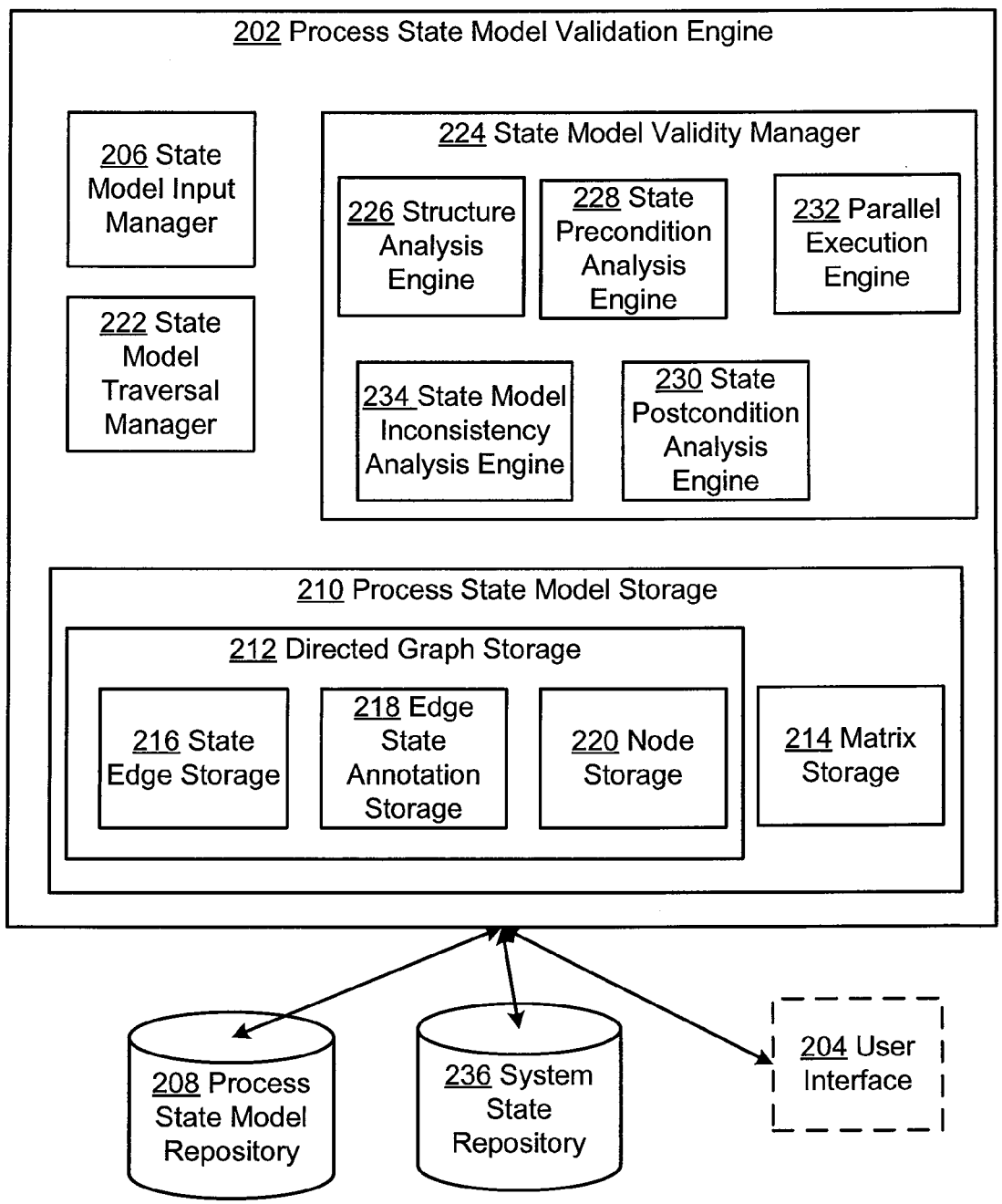
FIG. 2 is a block diagram of an example system for validating process state models according to an example embodiment.

FIG. 2 is a block diagram of a system 200 for validating process state models, for example, business process models. In the example of FIG. 2, a process state model validation engine 202 includes various processing engines that provide and process state models that may be displayed, for example, for users via a user interface 204. For example, the user may view via a graphical user interface process models to determine validity of execution of tasks represented by the process state models.

The process state model validation engine 202 may include a state model input manager 206 configured to obtain a process state model including a state directed graph including nodes associated with tasks and edges associated with a direction of flow of execution of the tasks, wherein edges entering nodes include state annotations including state precondition indicators indicating state values associated with the edges entering the nodes and edges exiting nodes include state annotations including state postcondition indicators indicating state values associated with the edges exiting the nodes. For example, the state model input manager 206 may obtain the process state model from a process state model repository 208 configured to store process state models such as business process models. According to an example embodiment, the process state model may include a model associated with web services. According to an example embodiment, the web services may include semantic web services.

According to an example embodiment, the process state model validation engine 202 may include a process state model storage area 210 configured to store information associated with the process state model obtained by the process state model validation engine 202. According to an example embodiment, the process state model storage area 210 may include a state directed graph storage area 212 configured to store information associated with the state directed graph, and a matrix storage area 214 configured to store information associated with a matrix associated with the state directed graph.

According to an example embodiment, the state directed graph storage area 212 may include a state edge storage area 216 configured to store information associated with the edges, an edge state annotation storage area 218 configured to store information associated with the edge annotations, and a node storage area 220 configured to store information associated with the nodes.

According to an example embodiment, the process state model validation engine 202 may include a state model traversal manager 222 configured to traverse the process state model to determine a flow of execution of activities associated with the tasks, the traversing the process state model including performing logical operations on state annotation values associated with the state annotations based on an ordering of the flow of execution.

According to an example embodiment, workflow structures included in the state directed graph may include one or more of a parallel execution workflow structure, a sequential execution workflow structure, a split execution workflow structure, or a merge execution structure. According to an example embodiment, paths included in the state directed graph may include a logical sequence of a group of the activities and a list of indicators associated with preconditions and postconditions associated with the group of activities.

According to an example embodiment, the process state model validation engine 202 may include a state model validity manager 224 configured to determine a validity of execution associated with a flow of execution of the activities associated with the tasks based on the traversing the process state model.

According to an example embodiment, the state model traversal manager 222 may be further configured to perform logical operations on state annotation values associated with the state annotations based on determining state values associated with state preconditions when traversing the process state model visits one of the edges entering one of the nodes, and determining state values associated with state postconditions when traversing the process state model visits one of the edges exiting one of the nodes, based on a depth-first traversal.

According to an example embodiment, each of the state precondition indicators may indicate a value associated with a state associated with one or more events associated with the process state model prior to execution of activities associated with the node entered by the edge associated with the each state precondition indicator, and each of the state postcondition indicators may indicate a value associated with a state associated with one or more events associated with the process state model after execution of activities associated with the node exited by the edge associated with the each state postcondition indicator.

According to an example embodiment, the state model validity manager 224 may include a structure analysis engine 226 configured to determine one or more execution structures included in the workflow structures.

According to an example embodiment, the state model validity manager 224 may include a state precondition analysis engine 228 configured to determine, for the first one of the nodes, whether first precondition state indicators associated with a first edge entering the first one indicate one or more positive values indicating a positive validity of execution of activities associated with the tasks associated with the first one.

According to an example embodiment, the state precondition analysis engine 228 may be configured to determine a state of a universe based on a state precondition indicator prior to a traversal entry into a node associated with the state precondition indicator.

According to an example embodiment, the state model traversal manager 222 may be further configured to determine a checking indicator indicating a checking relationship between each traversed path and previously traversed paths included in workflow structures included in the state directed graph, wherein each traversed path and each previously traversed path includes one or more nodes included in the state directed graph. For each traversed path, a list of state annotation indicators associated with the precondition state indicators and the postcondition indicators associated with the each traversed path may be generated. The checking indicator may be stored in a matrix that includes rows associated with the paths included in the workflow structures included in the state directed graph, similarly as discussed previously with regard to FIG. 1.

According to an example embodiment, the state model validity manager 224 may be further configured to determine the validity of execution based on determining the validity of execution associated with a flow of execution of the activities associated with the tasks based on checking a validity of execution status based on the checking indicators stored in the matrix and a state processing of the state annotation indicators included in one or more of the lists of state annotation indicators.

According to an example embodiment, the structure analysis engine 226 may be configured to determine that a first and second one of the nodes are included in a parallel execution structure included in the workflow structures.

According to an example embodiment, the state precondition analysis engine 228 may be configured to determine, for the first one of the nodes, whether first precondition state indicators associated with a first edge entering the first one indicate one or more positive values indicating a positive validity of execution of activities associated with the tasks associated with the first one.

According to an example embodiment, the state precondition analysis engine 228 may be configured to determine, for a first one of the nodes, whether first precondition state indicators associated with a first edge entering the first one indicate one or more positive values indicating a positive validity of execution of activities associated with the tasks associated with the first one.

According to an example embodiment, the state model validity manager 124 may include a state postcondition analysis engine 230 configured to determine, for the second one of the nodes, whether first postcondition state indicators associated with a second edge exiting the second one indicate one or more positive values indicating a positive validity of execution of activities associated with the tasks associated with the second one.

According to an example embodiment, the state model validity manager 224 may include a parallel execution engine 232 configured to determine a validity of parallel execution of tasks included in the parallel execution structure based on results determined by the state precondition analysis engine 228 and the state postcondition analysis engine 230.

According to an example embodiment, the state postcondition analysis engine 230 may be configured to determine a state of a universe based on a state postcondition indicator after a traversal exit from a node associated with the state postcondition indicator.

According to an example embodiment, the state model validity manager 224 may include a state inconsistency analysis engine 234 configured to determine one or more state inconsistencies associated with a flow of execution of the activities associated with the tasks based on the traversing the process state model.

According to an example embodiment, the system 200 may further include a system state repository 236 configured to store results of the logical operations on the state annotations. According to an example embodiment, the system state repository 236 may be configured to store values of states associated with the system, for example, based on occurrences of one or more events.

According to an example embodiment, an activity may include a description of a measure of work that may represent one logical step within a process. A workflow activity may involve human and/or machine resources to support process execution. According to an example embodiment, an activity may be represented as a node, step or task. According to an example embodiment, a link, connector or edge may lead from one workflow element to another. Each link may be associated with a source and a target element.

According to an example embodiment, a state may include a conjunction of facts that are represented by literals.

According to an example embodiment, a precondition may include a logical expression which may be evaluated by a workflow engine to determine whether a process instance or activity within a process instance may be started. According to an example embodiment, a precondition may include a set of literals which may be provided by a logical expression. According to an example embodiment, all of these literals may represent facts that need to be true so that an activity may be executed.

According to an example embodiment, a postcondition may include a logical expression which may be evaluated by a workflow engine to determine whether a process instance or activity within a process instance is completed. According to an example embodiment, a postcondition may include a set of literals which may be provided by a logical expression. According to an example embodiment, all of these literals may represent facts that are true after the execution of an activity.

According to an example embodiment, a path may include a sequence of activities and edges that may originate in a single point in a process model. Thus, all elements on a path may be connected via directed edges, wherein all edges form a sequence and one edge is connected to the start point, a split, or a merge structure. According to an example embodiment, a path may map to a split or merge structure from which it originated, and if there is none, to the start point of a process model. According to an example embodiment, a path may always reside between two nodes in a process model that are not events or activities. According to an example embodiment, a path may include a logical sequence of activities that may all be mapped to the same outgoing connector of a split structure. According to an example embodiment, a node may lie within a workflow pattern if it is executed after a split structure and before the merge structure corresponding to the split structure.

According to an example embodiment, an ontology may include a formal explicit specification of a shared conceptualization of a domain of interest. According to an example embodiment, ontologies may include concepts, which may represent ontological objects that are relevant in a domain of interest, relationships between concepts, or instances, which may represent individuals that are described by the concepts. For example, "Hindenburg" may be described by the concept "zeppelin."

According to an example embodiment, knowledge may be inferred from information based on ontologies. For example, from information such as "A plane is able to fly," in a discussion regarding things that fly, planes may be inferred as knowledge from the information. Semantic networks and rule based systems that include ontologies may thus serve as knowledge bases. According to an example embodiment, it may be possible to determine, in some cases, what was the intention of a user when a specific element of a process model was generated, based on ontologies, with regard to example validation techniques discussed herein. One skilled in the art of data processing may appreciate that there may be many ways to use ontologies.

According to an example embodiment, knowledge that is true for a certain domain of interest may be obtained based on ontologies. In this context, domain ontologies may describe concepts in a specific domain of discourse, or a specific set of possibilities. For example, constraints stored in an ontology may be analyzed (e.g., any man may have at most one wife (for a certain domain, e.g., the US)), and inferencing techniques may be used to derive implicit knowledge from explicit knowledge (e.g., if a man marries, then he has either not been married before or he was divorced before the marriage). Such example techniques may include update reasoning or incremental reasoning.

According to an example embodiment, ontologies may be used as data stores configured to store information associated with the components of a process model and their relationships. According to an example embodiment, an ontology may describe a business process model via instances, wherein each concept of the ontology may describe one part of a process model, such as a split structure, a merge structure or an activity.

Figure 3:
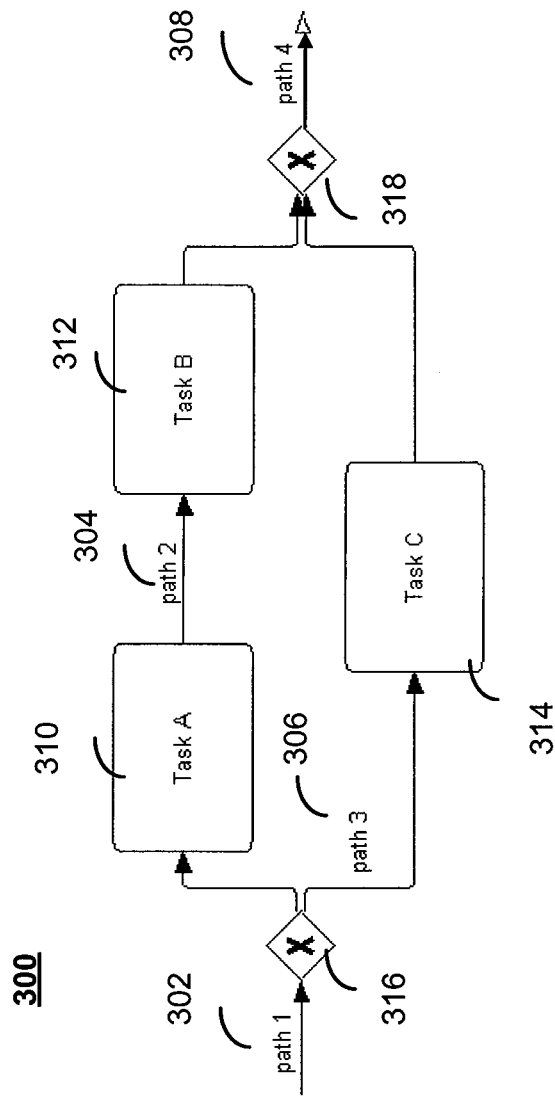
FIG. 3 depicts a portion of a process model according to an example embodiment.

FIG. 3 depicts a portion of a process model 300 according to an example embodiment. The example of FIG. 3 illustrates example paths 302, 304, 306, 308 and nodes 310, 312, 314 within workflow patterns. Within the example of FIG. 3, Task A 310 and Task B 312 are shown as lying on path 2 304 and Task A, B and C lie inside a split workflow pattern associated with a split structure 316 and a merge structure 318.

According to an example embodiment, a business process may include a sequence of activities, which may serve the creation of a product or service. A business process may be initiated by one or more events and may be completed through one or more events, and may be based on an organizational structure.

Thus, a business process may include activities that need to be executed in a certain order to reach a predetermined goal. Business process management may include a set of management activities associated with business processes. Such management activities may improve particular business processes in optimizing time, cost, and needed manpower. Such optimizations may be provided, for example, via computer programs configured to fulfill processes or particular process activities.

According to an example embodiment, business process models may be validated based on example correctness criteria. For example, in business environments, it may be important for a company to manage its business processes as easily as possible, covering as many activities as possible in company processes based on software. Thus, business process models may be used for tasks that may be replaced by computer programs. According to an example embodiment, scalable software fragments may be developed that are reusable and easily accessible. For example, Web services may be used to cover as many parts of a process model as possible. Using Service Oriented Design, software developers may investigate models composed by business experts. According to an example embodiment, these models may be checked automatically using semantic information to perform reasoning over a problem domain.

For example, business process models may automatically be checked for correctness. According to an example embodiment, a logical sequence validation and a parallel execution validation may be provided. According to an example embodiment, semantically enriched process models may be validated, wherein activities may be realized via web services. According to an example embodiment, correctness of an activity may be validated based on determining whether a precondition of the activity is fulfilled by the time it is scheduled in a process model. According to an example embodiment, correctness of an activity may be validated based on determining whether postconditions of activities do not interfere with other services which are enacted in parallel. According to an example embodiment, these example validations may be based on one or more of semantic representations of process models, web services or domain knowledge.

It may not be unusual that errors may occur in processes that may be described by semantic information. It also may not be unusual that a large part of programming work may include finding inconsistencies and errors in code, including work associated with automatically composing web services. It may thus be desirable to eliminate as many errors as possible in a composed process model, before web services are actually executed. Therefore, according to an example embodiment, the workflow may be validated based on existing semantic data, so that, if errors are determined, the user may be informed, and potential solutions may be proposed.

Figure 4:
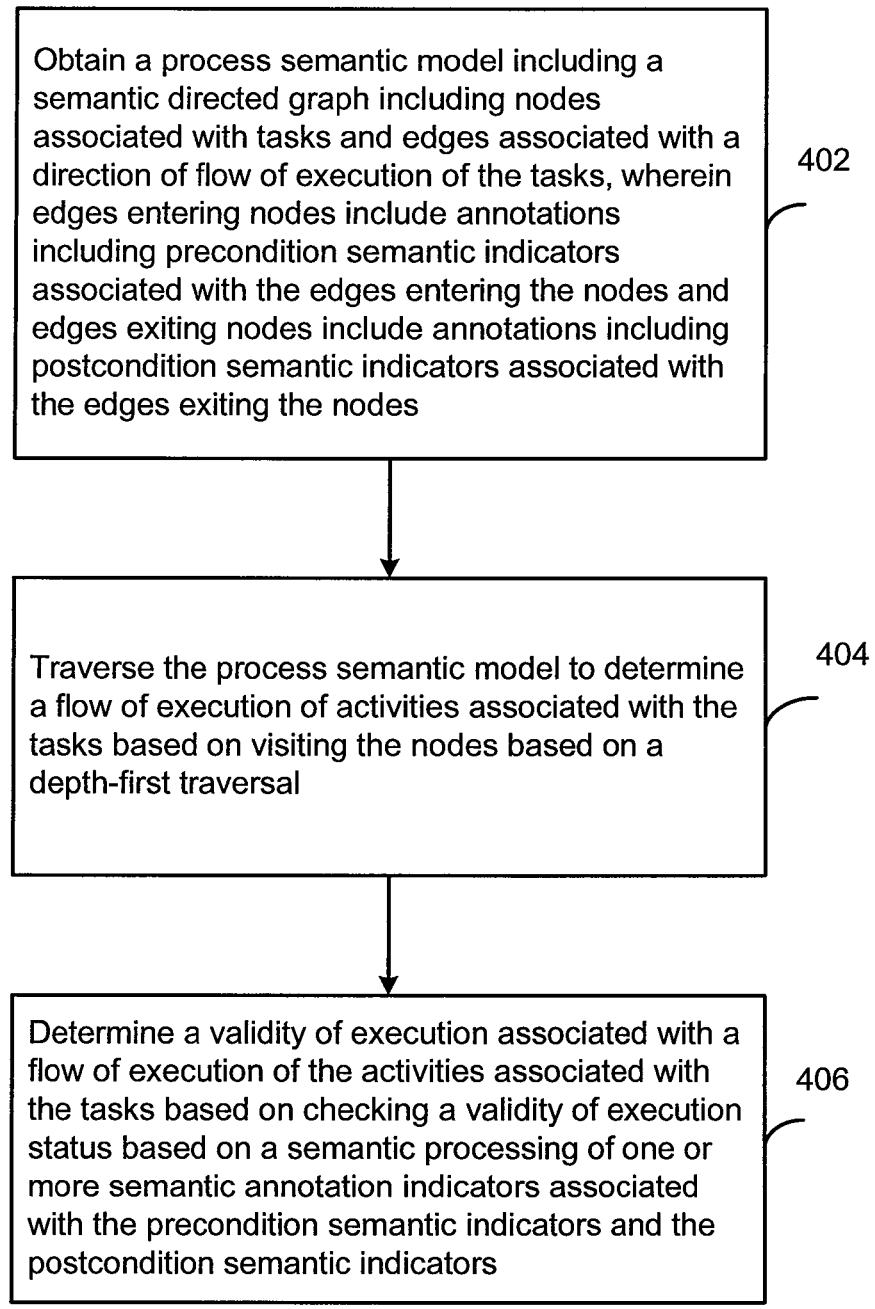
FIG. 4 is a flowchart illustrating an operation of the example system of FIG. 1.

FIG. 4 is a flowchart illustrating an example operation of the system of FIG. 1. At 402, a process semantic model including a semantic directed graph including nodes associated with tasks and edges associated with a direction of flow of execution of the tasks may be obtained, wherein edges entering nodes include annotations including precondition semantic indicators associated with the edges entering the nodes and edges exiting nodes include annotations including postcondition semantic indicators associated with the edges exiting the nodes. For example, the process semantic model may be obtained by the semantic model input manager 106 from the process semantic model repository 108, as discussed previously.

At 404, the process semantic model may be traversed to determine a flow of execution of activities associated with the tasks based on visiting the nodes based on a depth-first traversal. For example, the semantic model traversal manager 122 may traverse the process model to determine a flow of execution of activities associated with the tasks, as discussed previously.

At 406, a validity of execution associated with a flow of execution of the activities associated with the tasks may be determined based on checking a validity of execution status based on a semantic processing of one or more semantic annotation indicators associated with the precondition semantic indicators and the postcondition semantic indicators. For example, the semantic model validity manager 124 may determine a validity of execution associated with a flow of execution of the activities associated with the tasks based on a semantic processing of one or more semantic annotation indicators associated with the precondition semantic indicators and the postcondition semantic indicators, as discussed previously.

According to an example embodiment, traversing the process semantic model may include traversing the process semantic model to determine a flow of execution of activities associated with the tasks based on visiting the nodes based on a depth-first traversal. According to an example embodiment, the traversing the process semantic model may include determining a checking indicator indicating a checking relationship between each traversed path and previously traversed paths included in workflow structures included in the semantic directed graph, wherein each traversed path and each previously traversed path includes one or more nodes included in the semantic directed graph. According to an example embodiment, for each traversed path, a list of semantic annotation indicators associated with the precondition semantic indicators and the post condition indicators associated with the each traversed path may be generated. According to an example embodiment, the checking indicator may be stored in a matrix that includes rows associated with the paths included in the workflow structures included in the semantic directed graph. According to an example embodiment, the semantic model traversal manager 122 may be configured to determine a checking indicator indicating a checking relationship between each traversed path and previously traversed paths included in workflow structures included in the semantic directed graph, wherein each traversed path and each previously traversed path includes one or more nodes included in the semantic directed graph, as discussed previously.

According to an example embodiment, determining the validity of execution may include determining the validity of execution associated with a flow of execution of the activities associated with the tasks based on checking a validity of execution status based on the checking indicators stored in the matrix and a semantic processing of the semantic annotation indicators included in one or more of the lists of semantic annotation indicators. According to an example embodiment, the semantic model validity manager 124 may be further configured to determine the validity of execution based on determining the validity of execution associated with a flow of execution of the activities associated with the tasks based on checking a validity of execution status based on the checking indicators stored in the matrix and a semantic processing of the semantic annotation indicators included in one or more of the lists of semantic annotation indicators, as discussed previously.

For example, the structure analysis engine 126 may determine that a first and second one of the nodes are included in a parallel execution structure included in the workflow structures, as discussed previously.

According to an example embodiment, the workflow structures may include one or more of a parallel execution workflow structure, a sequential execution workflow structure, a split execution workflow structure, or a merge execution structure.

According to an example embodiment, each one of the paths includes a logical sequence of a group of the activities and a list of indicators associated with preconditions and postconditions associated with the group of activities.

Figure 5:
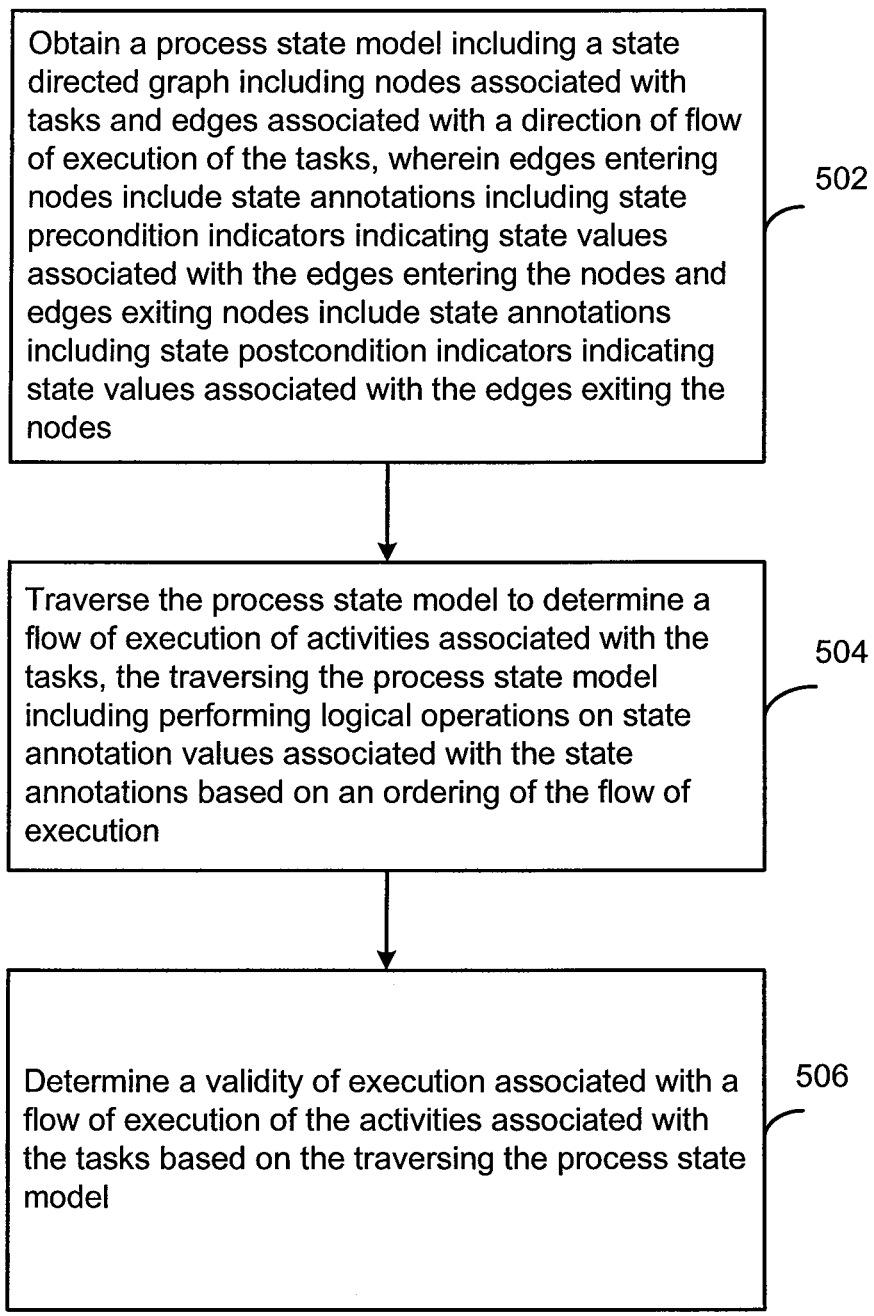
FIG. 5 is a flowchart illustrating an operation of the example system of FIG. 2.

FIG. 5 is a flowchart illustrating an example operation of the system of FIG. 2. At 502, obtaining a process state model including a state directed graph including nodes associated with tasks and edges associated with a direction of flow of execution of the tasks may be obtained. Edges entering nodes may include state annotations including state precondition indicators indicating state values associated with the edges entering the nodes and edges exiting nodes may include state annotations including state postcondition indicators indicating state values associated with the edges exiting the nodes. For example, the state model input manager 206 may obtain a process state model including a state directed graph including nodes associated with tasks and edges associated with a direction of flow of execution of the tasks, as discussed previously. For example, the state model input manager 206 may obtain the process state model from a process state model repository 208 configured to store process state models such as business process models. According to an example embodiment, the process state model may include a model associated with web services. According to an example embodiment, the web services may include semantic web services.

At 504, the process state model may be traversed to determine a flow of execution of activities associated with the tasks, the traversing the process state model including performing logical operations on state annotation values associated with the state annotations based on an ordering of the flow of execution. For example, the state model traversal manager 222 discussed previously may traverse the process state model to determine a flow of execution of activities associated with the tasks, performing logical operations on state annotation values associated with the state annotations based on an ordering of the flow of execution.

At 504, a validity of execution associated with a flow of execution of the activities associated with the tasks may be determined based on the traversing the process state model. For example, the state model validity manager 224 may determine a validity of execution associated with a flow of execution of the activities, as discussed previously.

According to an example embodiment, the state directed graph may represent a sequential execution workflow structure, wherein the tasks and edges may represent a sequential ordering of execution of the tasks included in the state directed graph.

According to an example embodiment, the performing logical operations on state annotation values associated with the state annotations may include determining state values associated with state preconditions when traversing the process state model visits one of the edges entering one of the nodes, and determining state values associated with state postconditions when traversing the process state model visits one of the edges exiting one of the nodes, based on a depth-first traversal.

According to an example embodiment, results of the logical operations on the state annotations may be stored in a state repository, for example, the process state model repository 208.

According to an example embodiment, properties of a process model may be realized via a graph-theory context. For example, "asynchronous directed graphs" may be used to realize certain types of process models. According to an example embodiment, these types of graphs may be further enhanced with further definitions associated with workflow structures.

According to an example embodiment, a process model on which validation techniques may be applied may include the following properties:

1) The process model includes nodes and directed edges. The directed edges may describe a sequential control flow dependency.
2) Nodes may include split, merge, start, end, or intermediate nodes.
3) A process model may include exactly one start and one end point. A start point may include exactly one outgoing edge, and an end point may include exactly one incoming edge.
4) An intermediate node may include exactly one incoming and one outgoing edge, and may include either type event or activity.
5) A merge node may include two or more incoming edges and exactly one outgoing edge.
6) A split node may include exactly one incoming edge and two or more outgoing edges.
7) A split or merge node may include any one of the following types: XOR, OR, or Parallel. At an XOR merge (split) exactly one of the incoming (outgoing) edges may be active (activated), at an OR merge (split) one or more of the edges may be active (activated), and at a parallel merge (split) all of the edges may be active (activated).

The process model may be completely semantically described. For example, for each activity preconditions and postconditions may be provided where the former describes information that needs to be true in order for the activity to be executable and the latter describes what has been changed after execution of the activity. For example, a domain ontology may describe a domain of interest associated with the business process model.

According to an example embodiment, a state based approach may be used to determine inconsistencies in process models. After each element included in a process model is visited via a traversal, one or more values associated with one or more states may be determined. Each state may include three parts: a) an intersection of all possibilities in the context of the process model domain, including literals or predicates that are true for each of the possibilities; b) a direct outcome union of all possibilities, which in contrast to the intersection, may inherit all outcomes (e.g., postconditions) that are optional; and c) a union of all possibilities, including in addition all alternatives that result from the execution of optional parts of the process. Thus, after each step, the postcondition of a web service may be added to the set of possibilities and the union, the direct outcome, and the intersection may be determined accordingly. According to an example embodiment, the intersection of all possibilities may be used, without any need for the direct outcome union or the union of all possibilities.

According to an example embodiment, the state information that is determined after a web service is executed may be added to a link that points to the next element for ease of access. According to an example embodiment, if a fact known to be true before the execution of an example Task T1 is negated by T1 (i.e., its negated form appears in the postcondition of T1), then the fact may be removed from the intersections (I) of all other states that are marked as being parallel, which may be based on the matrix as discussed previously.

According to an example embodiment, a web service may be executable if all information that forms a precondition is provided, i.e., if the information is available in the literals or predicates that are true for every possibility that precedes the service. According to an example embodiment, a reasoner may be utilized to determine whether information is in the state and to generate the states. Example evaluation techniques discussed herein may include a pattern based approach, wherein each service may be linked to its successive element, which may include another web service, a split- or merge structure, or a loop.

In order to initialize a validation, a start state may be generated, which may indicate all information that is available at the start of the process to be validated.

One example start state may include a simple state, assuming that all information needed for proper validation at the start of the process is available. For this example, the data and a background ontology may be input to a reasoner, which may provide a set of possibilities and their intersection. According to an example embodiment, after the start state is provided, the validation process may be initiated.

As a second example, it may be assumed that there is no information available that may be used to generate the start state. As a consequence, this data will need to be generated. The example start state is generated based on obtaining the precondition information of each web service in the process model, and adding it to the example start state. For example, a depth-first-search may be performed on the process model. Thus, if a split occurs in the process model, a first path may be selected and traversed completely, a second path may be selected and traversed completely, etc. If one of the paths includes another split structure, the technique is recursively applied until all possible paths of the process model have been traversed. Thus, a state may be generated in which all precondition information of all services may be stored. The example start state may be generated based on determining the intersection of all the precondition information so obtained. According to an example embodiment, a start state may be generated that it is minimal, based on minimizing the expected from the start state, based on only adding those preconditions which are determined not fulfilled yet.

Figure 6:
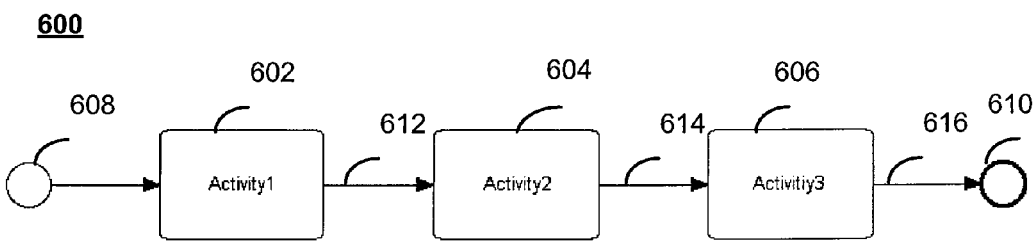
FIG. 6 depicts a sequence structure according to an example embodiment.

FIG. 6 depicts a sequence structure 600 according to an example embodiment. The sequence structure 600 as shown in FIG. 6 illustrates a workflow pattern of a process model that is simple in terms of process flow validation. A sequence may include a linear arrangement of elements 602, 604, 606 which is not interrupted by loops, split or merge structures. According to an example embodiment, the sequence structure may include a start element 608 and an exit element 610. According to an example embodiment, each element 602, 604, 606 (e.g., activity, split, merge or loop) may be connected to its successor via links 612, 614, 616. Thus, a sequence may exist if at least one link exists, that connects one service with another service. Sequence structures may occur in many types of split and loop structures.

Single elements may be checked similarly: the element is controlled, if a precondition of the service is part of the intersection of all possibilities, which may be saved in the current state. If this is the case, the postconditions are added to the state, and the next service is validated, using the same technique until an element other than a service is determined.

Figure 7:
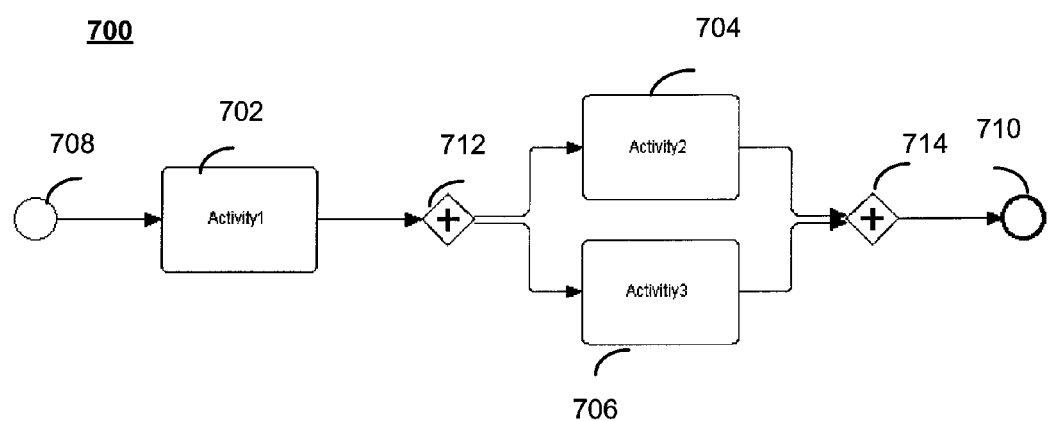
FIG. 7 depicts a parallel split structure according to an example embodiment.

FIG. 7 depicts a parallel split structure 700 according to an example embodiment. As shown in FIG. 7, three elements or activity nodes 702, 704, 706 are connected via a start 708, an exit 710, a parallel split 712 and a parallel merge structure 714. According to an example embodiment, each outgoing path of a parallel split structure may be traversed in order to verify the structure. Further splits may occur in one or more paths after the parallel split. Thus, since the merge structure marks the end of the split structure, a state may be generated that includes all state information associated with the incoming paths of the structure. Therefore, whenever a parallel merge structure is visited in a traversal, a checking technique may determine whether all paths that lead to the parallel merge structure have been validated already, according to an example embodiment. This determination may include verifying that there is a saved state in each link pointing to the parallel merge structure. If it is not true that all links have been validated already, the technique may proceed with the split structure and may validate its next path, using the state that was generated after the parallel split structure. If all incoming links of the parallel merge structure have been annotated with states and all checks for the parallel merge structures have been performed, these states may be merged.

According to an example embodiment, the union of all possibilities and the union of the intersections indicated by the states may be obtained, for a parallel merge. Information included in the possibilities then may include information regarding the postcondition of every service that has been enacted so far. The same is true for the intersections. By traversing each incoming path once, it may be verified that each path may be executed independently, treating each path like a sequence.

According to an example embodiment, each path of the split may be traversed again to determine whether a precondition or a postcondition of a service may be in conflict with the precondition and/or postcondition of another service that was enacted in parallel. By traversing the complete split structure once, information regarding the direct outcomes and the intersection stored for each path may be obtained (e.g., the information may be included in a parallel branch union (PBU)). According to an example embodiment, this information may be used during a second traversal to obtain a reasoning result regarding the intersection of literals in the state that precedes every service, based on reasoning whether there may exist an inconsistency with PBUs of other paths.

According to an example embodiment, each outgoing path exiting the parallel split may be tagged as part of the split structure, including paths that may be generated by further split structures that may be included as outgoing paths of the originating split, in order to determine whether all PBUs of all incoming paths have been checked. According to an example embodiment, a determination of the PBUs to be considered in the precondition and postcondition check of the second traversal may be made based on determining which paths have been tagged as dependent.

Figure 8:
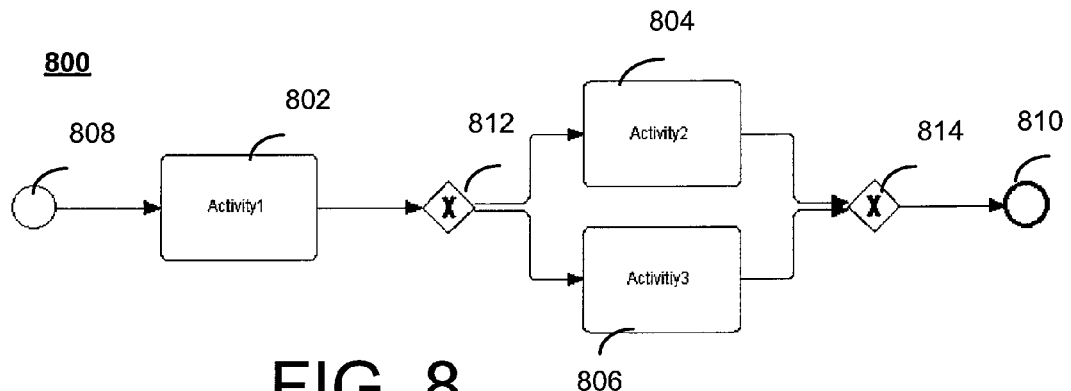
FIG. 8 depicts an exclusive choice structure according to an example embodiment.

FIG. 8 depicts an exclusive choice structure 800 according to an example embodiment. As shown in FIG. 8, three elements or activity nodes 802, 804, 806 are connected via a start 808, an exit 810, an exclusive choice split 812 and an exclusive choice merge structure 814. According to an example embodiment, upon exit from the activity node 802 and entry into the exclusive choice split 812, an exclusive-OR decision is made whether to enter the activity node 804 or the activity node 806. Upon exit from either of the activity nodes 804, 806, the exclusive choice merge structure 814 may be entered. According to an example embodiment, since no services are enacted in parallel (e.g., due to the exclusive-OR decision associated with the exclusive choice split 812), there is no need to perform precondition and postcondition checks in a second traversal as discussed previously with regard to a parallel execution structure. According to an example embodiment, when the exclusive choice merge structure 814 is traversed, the intersection of the intersection of all state information of incoming links may be determined. Thus, only information that is true in all possibilities and for every path of the exclusive choice split 812 may be available for the precondition check of a service after the exclusive choice merge structure 814 is visited via a traversal.

Figure 9:
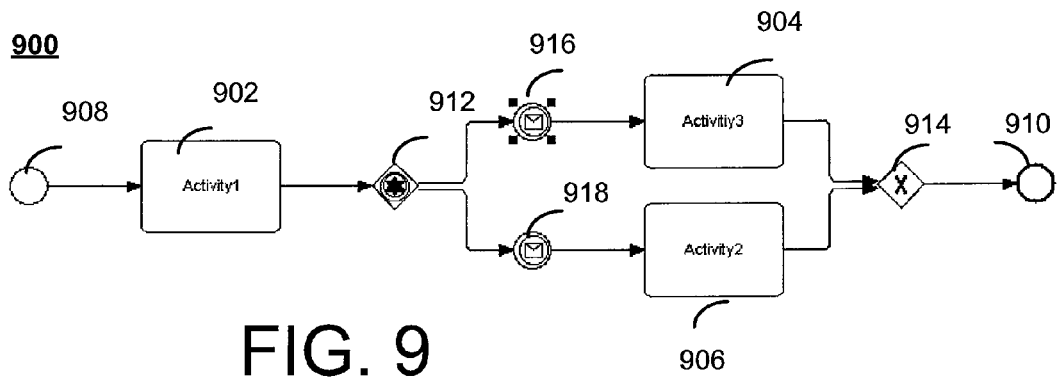
FIG. 9 depicts a deferred choice structure according to an example embodiment.

FIG. 9 depicts a deferred choice structure 900 according to an example embodiment. As shown in FIG. 9, three elements or activity nodes 902, 904, 906 are connected via a start 908, an exit 910, a deferred choice split 912, and a deferred choice merge structure 914. According to an example embodiment, the deferred choice pattern is triggered by events such as message events 916 and 918. According to an example embodiment, the postcondition of the events (e.g., the events 916 and 918) may be added to the reasoner, and the result may be treated similarly to the techniques discussed previously with regard to the exclusive choice structure 800.

Figure 10:
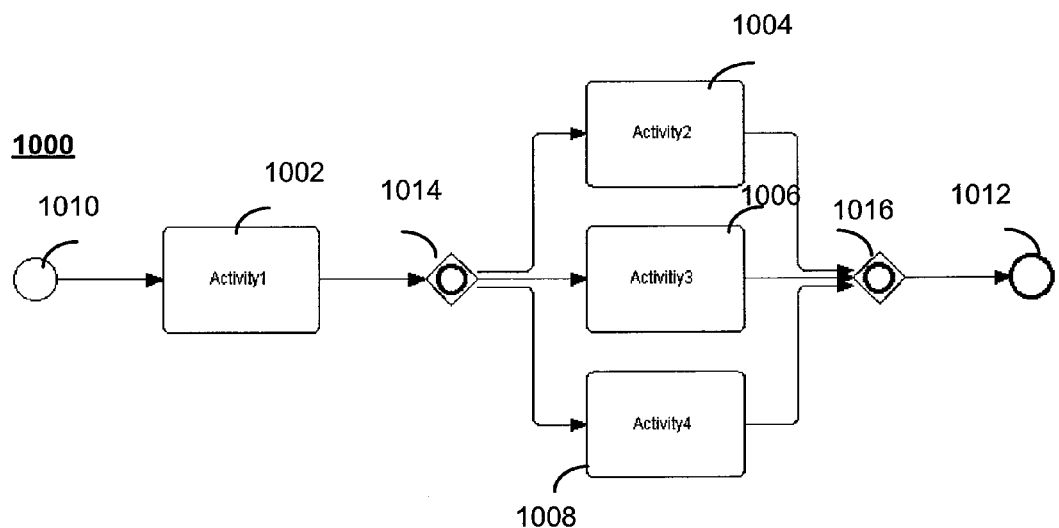
FIG. 10 depicts a multiple choice structure according to an example embodiment.

FIG. 10 depicts a multiple choice structure 1000 according to an example embodiment. As shown in FIG. 10, four elements or activity nodes 1002, 1004, 1006, 1008 are connected via a start 1010, an exit 1012, a multiple choice split 1014, and a multiple choice merge structure 1016. According to an example embodiment, the multiple choice structure 1000 may allow one or more paths to be executed. According to an example embodiment, it is possible that no path may be executed; however, this situation may be handled by executing a default path. According to an example embodiment, analogous techniques may be applied to the multiple choice structure 1000 as have been discussed previously with regard to the exclusive choice structure 800 and the deferred choice structure 900.

According to an example embodiment, sub-processes may be validated similarly to the structures discussed previously. According to an example embodiment, as the overall process is validated, each sub-process may be validated based on similar techniques. Therefore, each sub-process may be complex in terms of workflow structures and size.

Loop structures may also be validated using the example techniques discussed herein. According to an example embodiment, a loop may be verified based on verifying that the loop may be executed twice. According to an example embodiment, no checking may be performed regarding whether a termination condition of the loop is true. By traversing the loop twice, consequently updating the state with each enacted element included in the loop, it may be ensured that at least one element within the loop does not have a postcondition that negates the precondition of another element which has been enacted previous to the at least one element. According to an example embodiment, this technique may be based on an assumption that a loop may only occur inside split-merge or sequence structures, and that the loop is not allowed to break out of the inclusive split-merge or sequence structures. As loops may be treated similarly to sub-processes (e.g., the loop is executed twice instead of once) the loops may also include complexity similar to sub-processes.

Thus, semantic business process validation may be provided based on validating a process model, based only on semantic information. Example validation techniques discussed herein may determine whether data that is needed, for example, by a web service, is available by the time its execution is scheduled in the context of the overall process model. As discussed herein, example workflow patterns including parallelization, choice, sequence, loops and sub-processes may be validated. Further, an example start state may be generated that may serve as a basis for the validation, as discussed previously.

According to an example embodiment, execution order of activities may be validated via process models. According to an example embodiment, ordering of execution may be validated based on determining whether preconditions of a specific activity are fulfilled. Thus, the determination may be based on the postcondition information of all preceding activities.

Figures 11, 12:
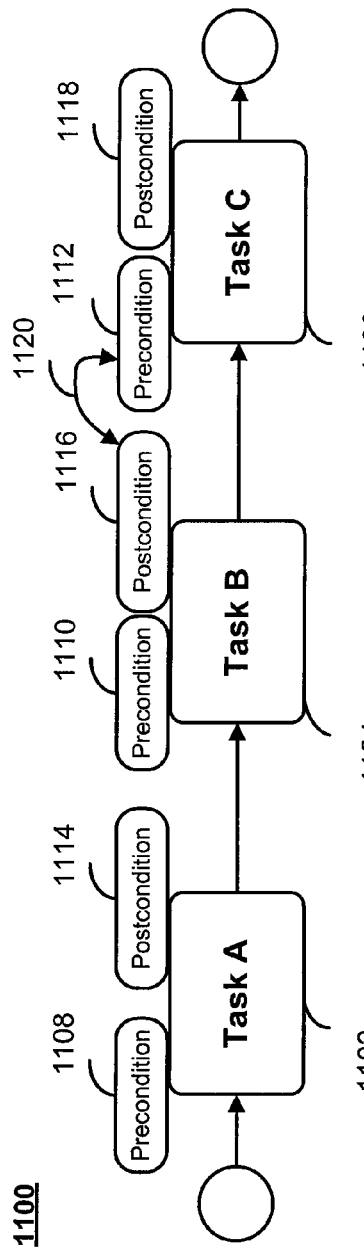
FIG. 11 depicts a sequence structure with preconditions and postconditions according to an example embodiment.
FIG. 12 depicts a table illustrating preconditions and postconditions associated with the sequence structure of FIG. 11 according to an example embodiment.

FIG. 11 depicts a sequence structure 1100 with preconditions and postconditions according to an example embodiment. The simplest problem in determination of errors within an execution order of activities may be depicted via the sequence structure 1100 as shown in the example of FIG. 11. As shown in FIG. 11, specific activities 1102, 1104, 1106 may be included in a sequence. Each activity 1102, 1104, 1106 may include respective preconditions 1108, 1110, 1112, and respective postconditions 1114, 1116, 1118. For the example of FIG. 11, an activity may be regarded as a task.

As shown in FIG. 11, task C 1106 may be indicated not to be executable. For example, task A 1102 may be associated with renting a car at location X, task B 1104 may be associated with driving to location Y, and task C 1106 may be associated with returning the car.

FIG. 12 depicts a table 1200 illustrating preconditions 1202 and postconditions 1204 associated with the sequence structure of FIG. 11 according to an example embodiment. If the facts car available and locationIsX are known to be true before the process is executed, then the preconditions 1108, 1110 associated with task A 1102 and task B 1104 may be known to be fulfilled. Based on the information stored in the table 1200, it may be determined easily that task C 1106 may not be executed, as its precondition 1112 may not be fulfilled by the postconditions 1114, 1116 of the preceding services 1102, 1104, and the required fact is negated by the preceding service 1104, as indicated by an arrow 1120 in FIG. 11. An example solution may include insertion of a new task after task B 1104 and before task C 1106 that includes a postcondition "locationIsX AND NOT locationIsY." Sequences are workflow patterns that may be included within other workflow structures, for example, after a parallel split, before a parallel merge, etc.

Figure 13:
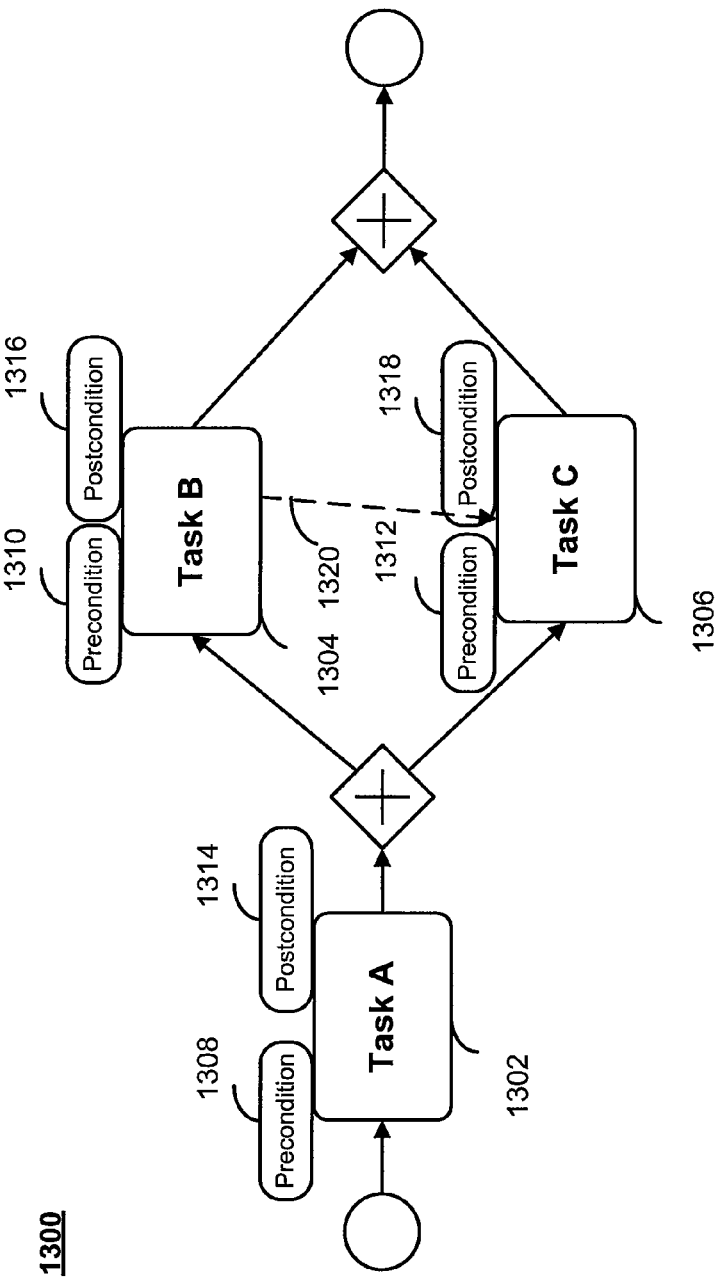
FIG. 13 depicts a parallel split structure according to an example embodiment.

FIG. 13 depicts a parallel split structure 1300 according to an example embodiment. As shown in FIG. 13, activities 1302, 1304, 1306 may include respective preconditions 1308, 1310, 1312, and respective postconditions 1314, 1316, 1318. As shown in FIG. 13, activity 1302 may precede a parallel split in which activities 1304, 1306 may be included in two branches of the split.

As shown in FIG. 13, an arrow 1320 leading from task B 1304 to task C 1306 may indicate one or more dependencies, for example, a dependency of task C 1306 on task B 1304, wherein the tasks are executed in parallel.

As shown in FIG. 13, task B 1304 must be executed before task C 1306, otherwise task C 1306 may not be enacted, i.e., the postcondition 1316 of task B 1304 includes information that is necessary for task C 1306. Referring to the car discussed previously, task B 1304 may represent renting a car and task C 1306 may represent driving to location X. Thus, task B 1304 must be enacted before task C 1306. Thus, an error may be determined in the order of execution of the tasks included in the parallel split structure 1300.

According to an example embodiment, errors in a control flow may be verified. According to an example embodiment, a semantically described process model may be checked for deadlocks, based on verifying that every activity may be executed at the point of time in the process model where it is scheduled and by determining whether the split and merge structures are appropriate. Moreover, example techniques discussed herein not only determine whether the process model is formally correct, i.e., correctly modeled, but also whether it is semantically correct. Based on semantic correctness, it may be determined whether a service may be reached in the process model, and whether it may be enacted in terms of fulfilled preconditions, according to an example embodiment.

According to an example embodiment, it is possible to determine which information may be available at a certain point in time within a process model, based on storing and processing semantic information. According to an example embodiment, relevant information may be translated into literals (e.g., predicates with either a positive or a negative value). These literals may be used to represent inputs and outputs of activities or web services. According to an example embodiment, information residing within a domain ontology may also be represented by literals in the form of clauses (e.g., a disjunction of exactly one positive and one negative literal stating what is true in a domain of discourse). Thus, subsumption reasoning may be performed (e.g., information implied by the background theory may be determined).

Figure 14:
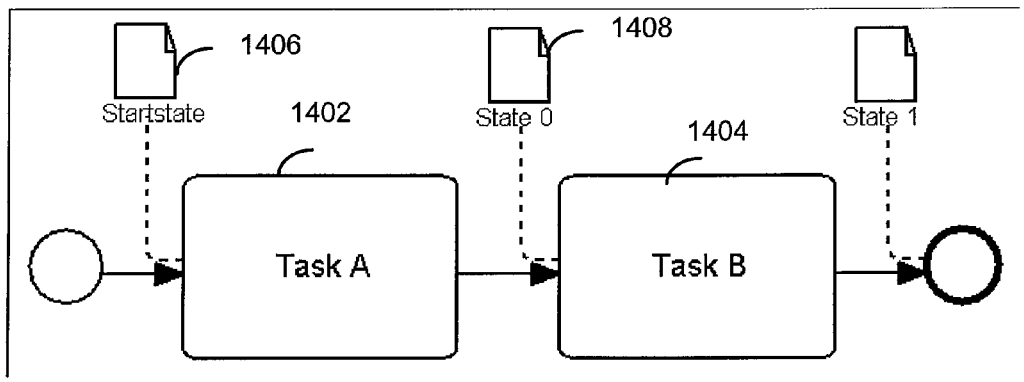
FIG. 14 depicts a sequence structure with states according to an example embodiment.

FIG. 14 depicts a sequence structure 1400 with states according to an example embodiment. As shown in the example of FIG. 14, a small sequence includes two tasks 1402, 1404. All preliminary information that is true before the process model is enacted is known, as depicted by a startstate 1406 associated with task A 1402. This information is used to check preconditions associated with task A 1402 against the information in the state 1406. If the state 1406 includes the necessary information, i.e., the literals that were derived from a semantic web service or activity precondition, the activity may be enacted. If the state 1406 does not include the necessary data, an error may be determined, because not enough, or inconsistent information is available from a preceding state.

If the required precondition information is covered by the literals in the state 1406, task A 1402 may be enacted and therefore may change the domain of interest with its postcondition. Thus, the knowledge base in which the current information is stored, i.e., the state, may be updated. According to an example embodiment, all of the postcondition literals may be added to the knowledge base such that literals that were not known in the knowledge base before may be added, and literals that have changed values (e.g., turn from negative to positive) may be updated such that the old literal may be deleted and the new one may be added. A new state 1408 may then be used to determine whether the precondition of task B 1404 is fulfilled. If so, the information of the postcondition may be used to update a following state.

According to an example embodiment, for every activity there exists a preceding state that may be checked for precondition literals. According to an example embodiment, states may be connected to the incoming and exiting connectors of tasks. According to an example embodiment, a preceding state may include a state which is connected to an incoming link of an activity that is to be checked. A preceding state may include information that is known before the process is enacted and the postconditions of all services that have been executed in a logical sequence until that point.

According to an example embodiment, to ensure that every element within a process model is validated, a depth-first search may be performed. According to an example embodiment, each path within a process model may be traversed until the end event of a process model or a merge structure is reached or visited, wherein not all incoming paths have been traversed. If a merge structure is reached, the depth first algorithm may back up to the split structure that was discovered last, choose the next outgoing path and proceed. Every link that has been traversed already may be revised with respective state values. According to an example embodiment, when a split structure is reached or visited, all outgoing paths may be enhanced with respective state values.

Figure 15:
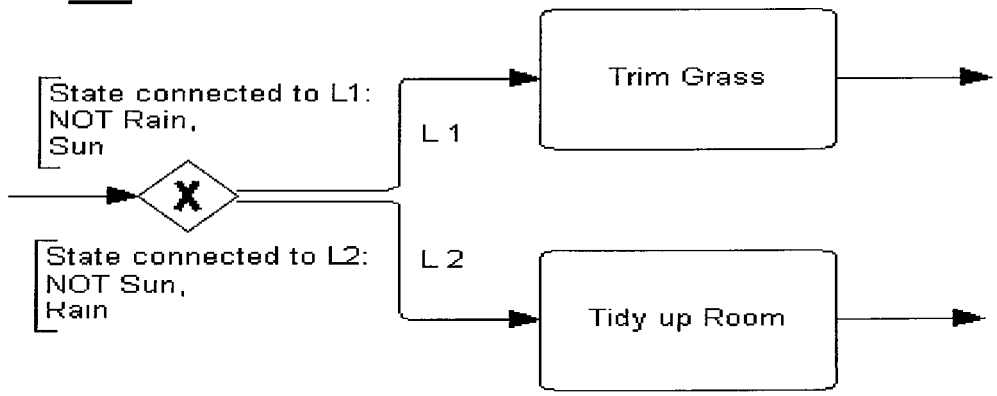
FIG. 15 depicts an exclusive choice structure according to an example embodiment.

FIG. 15 depicts an exclusive choice structure 1500 according to an example embodiment. According to an example embodiment, exclusive choice patterns may include conditions that define which path is chosen under particular circumstances according to an example embodiment. According to an example embodiment, those conditions may be applied to the state information. According to an example embodiment, one state may be generated for each outgoing path. The state information may then be updated as discussed below. As shown in the example of FIG. 15, a split structure is depicted with two outgoing edges. A condition to take one edge is that it rains; the condition to take the other is that the sun shines. The first path may therefore be annotated with a state that includes information indicating that it does not rain and the sun does shine. A state annotated to the second edge may include information indicating that it rains and the sun does not shine. Based on these facts, activities following these edges in execution may be executed if their precondition is fulfilled. Thus, FIG. 15 shows two example activities Trim Grass and Tidy up Room that may be executed depending on the condition added to the incoming link associated with each activity.

According to an example embodiment, when a parallel split is reached, the state information associated with the incoming edge may be copied and linked to all outgoing edges. Computation of a new state is not needed, since parallel splits do not require or include any conditions.

The behavior of a deferred choice pattern may be similar to the behavior described above; however the deferred choice pattern may include a condition which may be specified, not directly within the semantic information of the structure, but by events that may be modeled for each outgoing path. Therefore, when a deferred choice structure is reached, the state information may be copied to all outgoing edges and the specific state information may then be generated when the event is reached.

According to an example embodiment, when a simple merge pattern is reached, wherein all incoming paths have been traversed (i.e., all incoming edges have been linked to states) the state information may be merged so that a state for the outgoing edge of the merge element may be specified. According to an example embodiment, every merge element may include two or more incoming links and one outgoing link. The states of all incoming paths may be merged such that the intersection of all incoming states may be generated, wherein the intersection may include the information that is true in every domain of interest.

The following criteria may be used to perform this merge: 1) literals that are included in every state may be used; 2) literals that are not included in every state may be discarded; and 3) literals that are conflicting (i.e., within one state the same literal is stated to be true and within another the literal is stated to be false) may be discarded.

According to an example embodiment, all literals that are not discarded, and the background theory may be added to the state that is linked to the outgoing edge of the merge structure. Thus, that no matter what path within the choice structure is executed, the successor services may be enacted; else, the process model may be determined to be erroneous.

Figure 16:
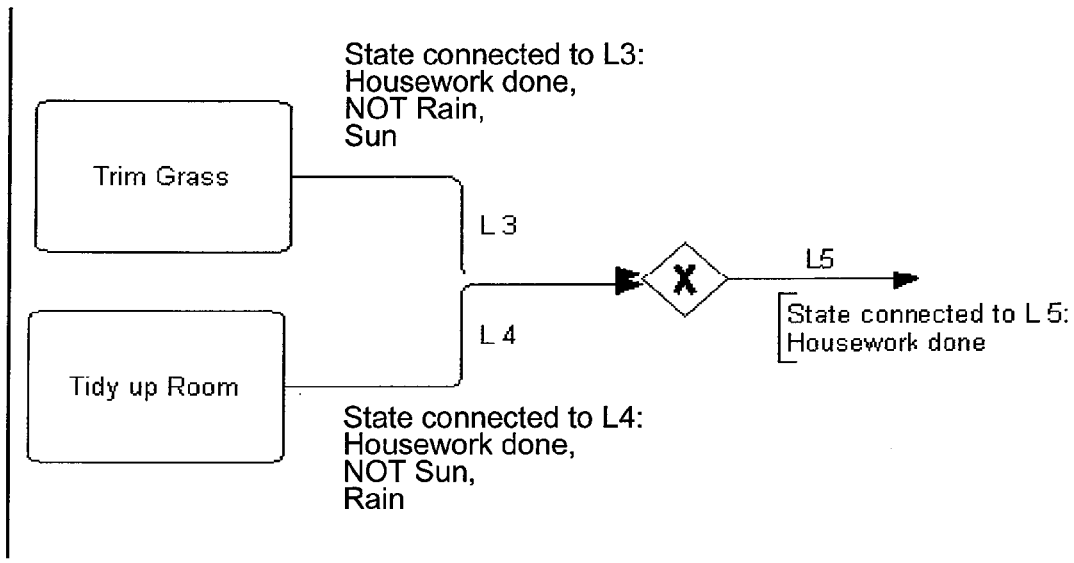
FIG. 16 depicts an exclusive choice structure according to an example embodiment.

FIG. 16 depicts an exclusive choice merge structure 1600 according to an example embodiment. As shown in FIG. 16, the sun and rain example discussed previously is continued. As depicted in FIG. 16, only information that is true in both incoming states may be provided for the state connected to the outgoing link of the merge structure 1600. According to an example embodiment, the behavior of a multiple choice merge and respectively synchronizing merge patterns may include the same technique as discussed above.

According to an example embodiment, when a parallel merge structure is reached, wherein all incoming edges have been annotated with states, a technique similar to the one depicted above may be applied, and a new state may be generated that is linked to the outgoing edge with the information provided from the states of the incoming edges. However, the union of the state information is used instead of the intersection. According to an example embodiment, criteria for this may include: 1) literals that are included within every state may be utilized; 2) literals that are not included in every state may be utilized; 3) for literals that are conflicting (i.e., if a literal is declared to be true in one state and within another the literal is declared to be false), a potential error may be generated since no element within a parallel split may negate the postcondition of another event enacted in parallel.

According to an example embodiment, loop validation may also be performed based on the state based techniques discussed previously. For example, it may be determined whether all activities that are modeled within a loop are executable. For example, if a loop is modeled as multiple instances (e.g., similar to a sub-process that may be executed multiple times), all elements may be evaluated similarly to a normal process, based on considering the state information associated with the incoming link of the loop structure as a startstate. After the validation of the complete subprocess is complete, the resulting state may be utilized as a startstate for a second validation of all elements. Using the techniques discussed previously, it may be determined whether the loop is executable if all elements are only executed once, and further, it may be determined whether the postconditions of the executed activities within a loop are conflicting with their preconditions when execution is repeated.

In addition to determining whether an activity (e.g., a web service) may be enacted at a certain point in a process model, other checks may be performed that may be closely related to parallelism in business process models. For example, a parallel execution validation may only need to be performed if a parallel split structure is included in a process model. According to an example embodiment, semantically annotated business process models that include the parallel split pattern may be verified, based on semantic data.

According to an example embodiment, in order to be able to perform the desired checks, the preconditions and postconditions of every action included in a graph may need to be known and stored such that they may be accessed later. Thus, for every path, a list of literals from the preconditions and postconditions of the activities belonging to that path may be generated. Only those paths that are included in a parallel split structure, either directly or through indirect connection, may be considered for validation. Consequently, paths that are located outside a parallel split structure may not be included in parallel execution validation. Thus, parallel execution validation may only include those paths within a process model that have been identified as paths to be executed in parallel, according to an example embodiment.

According to an example embodiment, techniques for path validation are discussed below. A slight modification of a depth-first search algorithm may be used to enumerate the paths of a semantically described process model, wherein every element of every possible execution path may be traversed. Thus, the number of paths included in the process model may be determined, as well as which activities belong to the paths. According to an example embodiment, all activities that are discovered on a certain path during the enumeration process may be marked as belonging to that path. Therefore, a path may include a logical sequence of a finite number of activities and a list of their preconditions and postconditions. According to an example embodiment, all paths may be enumerated in the order in which they are traversed by the techniques discussed herein.

According to an example embodiment, every number of a path may be added to a matrix, whose dimensions are based on the number of paths that have already been determined. According to an example embodiment, the matrix may be used to determine which paths need to be checked with each other. With every path discovered, According to an example embodiment, the dimensions of the matrix may be extended by one as each path is determined by an enumeration technique. Thus, every number that indicates a dimension of the matrix represents the number of a path that was determined. Every field within a row of the matrix that represents a discovered path may be filled with a "true" or "false" value.

According to an example embodiment, a value of "true" may indicate that the path needs to be checked with the path that is indicated by the x-axis value of the current field, whereas "false" may indicate that the path does not need to be checked with the path that is indicated by the value of the x-axis for the current field.

Figure 17:
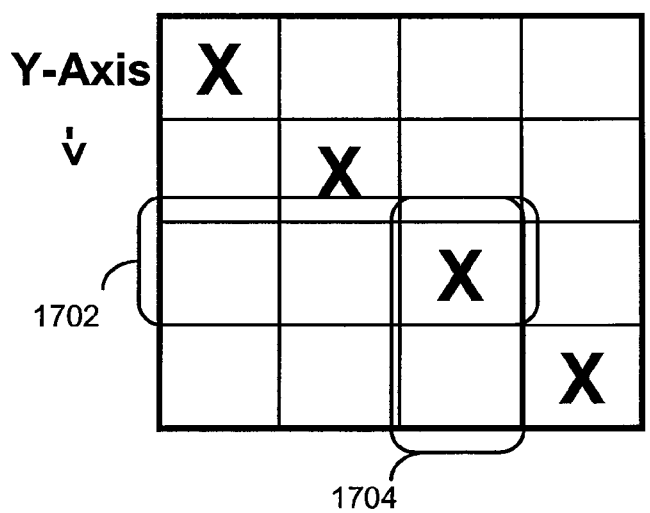
FIG. 17 depicts a matrix for path validation according to an example embodiment.

FIG. 17 depicts a matrix 1700 for path validation according to an example embodiment. For example, the matrix 1700 may correspond to a matrix stored in the matrix storage area 114 discussed previously. The matrix as shown in FIG. 17 is empty for illustration purposes. As shown in the example of FIG. 17, the matrix includes two dimensions, labeled via a y-avis (e.g., vertical axis) and an x-axis (e.g., horizontal axis). The example values to be stored in the matrix 1700 based on these dimensions may represent path IDs. As path IDs may be enumerated based on a traversal of a process model, the path IDs may increase linearly, according to an example embodiment. Thus, an extension of the matrix may increase linearly in size as well. One skilled in the art of data processing will appreciate that path IDs may be assigned by numerous means other than a linear sequence, and that path identifier checking indicators may be stored in structures other than a two-dimensional matrix, without departing from the spirit of the discussion herein.

As shown in the example of FIG. 17, the fields on the diagonal line of the example matrix 1700 may be filled with "X" values, which may symbolically indicate a value of "false." One skilled in the art of data processing will appreciate that the example matrix 1700 may be implemented as numerous types of structures, at least including bit vectors, sparse arrays, or bit maps, without departing from the scope of the present discussion. These fields may indicate that a path will not need to be checked against itself, and therefore these entries may be inserted as an initialization of the matrix, according to an example embodiment. The fields or elements of the matrix 1700 that are shown above the "X" diagonal may be filled as the matrix 1700 is extended with new paths.

According to an example embodiment, these sections above the "X" diagonal may be filled with values based on the symmetrical aspects of the matrix 1700. According to an example embodiment, information regarding which part of the matrix needs to be checked with which other part may be determined in accordance with one or more of the following:

1. Retrieve the values that range from field 0 to the "X" diagonal, and then retrieve the values represented by column values starting from field "X" and then retrieve every value in the column below the field "X" on the diagonal, as shown by enclosed areas 1702, 1704 of FIG. 17.
2. Retrieve the values by examining the complete row, wherein the values stored behind the "X"-diagonal are the same as those that are stored below the X.

The values that are filled in for the remainder of the matrix, as indicated by the fields below the "X"-diagonal in the example matrix of FIG. 17, may depend on a specific workflow pattern that leads to the generation of new paths. Therefore, example structures are discussed below, including a discussion of example matrix operations associated with additions to the matrix.

FIGS. 18-21 illustrate example process model structures according to an example embodiment. One skilled in the art of data processing may appreciate that two paths shown entering or exiting the example structures shown in FIGS. 18-21 may represent any number of paths entering or exiting the structures. However, if one path is shown entering or exiting, only one path may be allowed, according to an example embodiment.

The following discussion relates to actions that may be executed when the example modified depth-first search technique reaches one of the example structures as illustrated in FIGS. 18-21.

Figure 18:
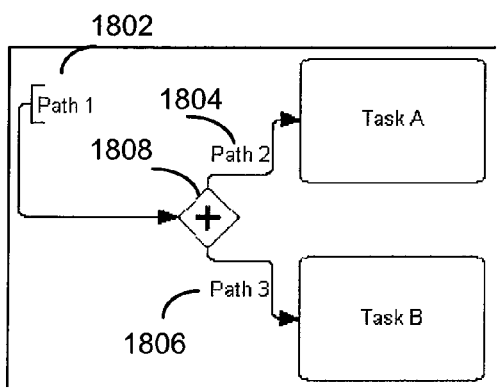
FIG. 18 depicts a parallel split structure according to an example embodiment.

FIG. 18 depicts a parallel split structure 1800 according to an example embodiment. According to an example embodiment, when a parallel split structure is reached via an example depth-first traversal, every outgoing or exiting path may be assigned a path ID (e.g., a numeric identifier) as shown by an incoming path 1 1802 and exiting path 2 1804 and path 3 1806 of FIG. 18. For example, in FIG. 18, the "Path 1" 1802 may enter a parallel split structure 1808, and the two paths 1804, 1806 may exit the parallel split structure 1808, tagged as "Path 2" and "Path 3." The dimension of the example matrix 1700 may be extended with the numbers corresponding to the path IDs, and "false" values may be filled in automatically for matrix entries for which the x-axis index value of the matrix equals the y-axis index value and both equal the id of the newly added path (e.g., matrix [id, id]←"X"). For example, "false" values may be inserted in the matrix 1700 for example entries matrix [2, 2] and matrix [3, 3].

One skilled in the art of data processing may appreciate that in a conventional depth-first-algorithm, only one outgoing or exiting path may be considered; however, in order to extend and fill the example matrix 1700 properly, both paths of a split structure may be analyzed with regard to the modified depth-first search according to an example embodiment. Otherwise, the example traversal technique may first pursue one path, until it cannot be followed further, before pursuing the next path. Thus, when the traversal reaches a merge structure, wherein not all incoming paths have been traversed yet, the example traversal technique backs up to the last split structure where not all paths have already been traversed.

After the matrix 1700 is extended, the newly added row may be filled with values, according to an example embodiment. As discussed previously, if a path needs to be checked against a currently added path, the value "true" may be inserted into the corresponding field; else, the value may be left as "false." When a parallel split is encountered in a traversal, all outgoing or exiting paths need to be checked against each other, according to an example embodiment. The incoming path, as discussed previously, need not be checked. The new fields in the example matrix 1700 may be filled accordingly.

According to an example embodiment, when an incoming path of a parallel split structure is itself one of the outgoing or exiting paths of another split- or merge structure, the path includes an indirectly connected path. Thus, with regard to the matrix 1700, all paths that may be arranged in a logical sequence before this path also do not need to be checked. Therefore, the row in the example matrix 1700 that represents the incoming path may be copied to the new row and thus all paths that have been set to "false" in the incoming path will not need to be checked against the new paths as well. The copying may be performed for all outgoing or exiting paths, according to an example embodiment.

A final step may include inserting the new values into the newly added columns, which may be accomplished by simply mirroring the values of the new row, due to the symmetrical aspects of the matrix 1700 discussed previously. Therefore, when a parallel split structure is reached in a traversal: 1) the matrix 1700 may be extended with the IDs of the outgoing paths; 2) matrix values may be set to "false" for matrix entries wherein the x and y index values associated with the entries are equal and both index values are equal to the new path IDs; 3) matrix information associated with the incoming path may be copied to matrix entries associated with all outgoing or exiting paths; 4) the corresponding values may be set, so that all outgoing or exiting paths may be checked against each other; 5) the new row values may be inserted in the new columns based on the symmetrical aspects of the matrix 1700 discussed previously.

According to an example embodiment, techniques for filling the matrix 1700 may depend on different types of process model structures that may be visited during a traversal of the process model, as discussed further below. According to an example embodiment, the parallel split and the multiple choice structures may receive substantially the same treatment with regard to filling in entries of the matrix 1700.

Figure 19:
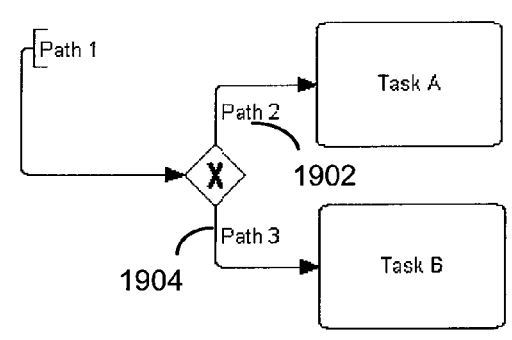
FIG. 19 depicts an exclusive choice split structure according to an example embodiment.

FIG. 19 depicts an exclusive choice split structure 1900 according to an example embodiment. The exclusive choice split structure 1900 may receive treatment similarly as the parallel split structure 1800, except that outgoing or exiting paths 1902, 1904 do not need to be explicitly checked against each other, because they may not be executed in parallel, due to the nature of the choice workflow pattern. The matrix 1700 may therefore again be extended with the IDs of all outgoing or exiting paths, and the fields associated with the parallel paths, which are involved in the exclusive choice structure, may be set to "false." Therefore, according to an example embodiment, when an exclusive choice split structure is reached in a traversal: 1) the matrix may be extended with the IDs of the outgoing or exiting paths; 2) the matrix may be set to "false" for matrix entries wherein the x and y index values associated with the entries are equal and both index values equal the new path IDs; 3) the incoming path values may be copied to all outgoing or exiting paths; 4) the corresponding values may be set, so that none of the outgoing or exiting paths may be checked against each other; 5) the new row values may be inserted in the new columns based on the symmetrical aspects of the matrix 1700 discussed previously.

According to an example embodiment, the exclusive choice structure 1900 may be treated substantially the same as the deferred choice structure.

Figure 20:
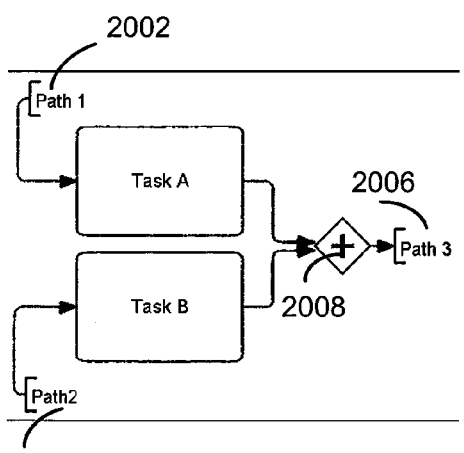
FIG. 20 depicts a synchronizing merge structure according to an example embodiment.

FIG. 20 depicts a synchronizing merge structure 2000 according to an example embodiment. As shown in the example of FIG. 20, multiple different incoming paths 2002, 2004 may be merged into one outgoing or exiting path 2006 in accordance with a synchronizing merge join 2008. According to an example embodiment, when the parallel merge structure is reached during enumeration, and not all incoming paths have been set, it is not enacted. Therefore the following discussion pertains to actions to be performed when all incoming paths have been enacted already. With regard to the synchronizing merge structure 2000, none of the incoming paths 2002, 2004 need to be checked with the outgoing or exiting path 2006, and none of the paths that precede the incoming paths 2002, 2004 need to be considered for checking. Thus, matrix entries associated with the outgoing or exiting path 2006 may be generated, by providing an ID and extending the matrix with that ID, as discussed previously.

However, fields within the new row that refer to all previously incoming paths may be set to "false." Since those paths may be indirectly connected to a split structure, their values may be incorporated as well. According to an example embodiment, a logical AND operation may be used to generate the conjunction over all respective incoming paths. According to an example embodiment, the conjunction may be performed based on comparing all values of one path against all values of another.

According to an example embodiment, Table I as shown below depicts values that may be selected to be added to the new path, based on the specific values of the fields that are checked. Matrix entries included in a matrix 1700 row associated with an outgoing or exiting path may be set to "true" only if the values are "true" in both lines. Thus, if an incoming path includes a "false" value, then the corresponding position in the matrix 1700 row associated with the outgoing or exiting path may also be set to "false." According to an example embodiment, all values of the incoming paths are processed, excluding those values that are included in the newly added column.

TABLE I

| AND (∧) | False | True |
|---|---|---|
| False | 0 | 0 |
| True | 0 | 1 |

Therefore, according to an example embodiment, when a synchronizing merge structure is reached in a traversal: 1) the matrix 1700 may be extended with the IDs of the outgoing or exiting paths; 2) matrix values may be set to "false" for matrix entries wherein the x and y index values associated with the entries are equal and both index values are equal to the new path IDs; 3) the conjunction of all incoming paths may be generated and the corresponding values may be inserted into the matrix 1700 in the added row; and 4) the new row values may be inserted in the new columns based on the symmetrical aspects of the matrix 1700 discussed previously. According to an example embodiment, more than two paths may be merged. For example, a may be based on a logical AND over all the incoming edges, such an exiting edge field may be set to "true" only if all incoming edges are associated with a "true" value.

Figure 21:
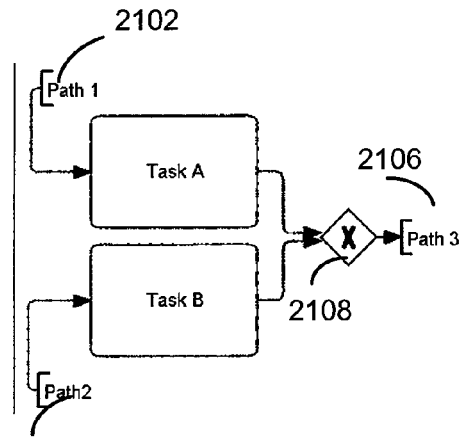
FIG. 21 depicts an exclusive choice merge structure according to an example embodiment.

FIG. 21 depicts an exclusive choice merge structure 2100 according to an example embodiment. As shown in the example of FIG. 21, multiple different incoming paths 2102, 2104 may be merged into one outgoing or exiting path 2106 in accordance with an exclusive choice merge join 2108. According to an example embodiment, the exclusive choice merge structure is closely related to the synchronizing merge structure. According to an example embodiment, when the exclusive choice merge structure is reached during enumeration, the incoming paths and outgoing or exiting paths may be treated similarly to the synchronizing merge structure 2000, except that values in the newly generated row may be determined based on operations indicated by entries shown in Table II below instead of by conjunction. Thus, even though multiple incoming paths may be considered, and their values may be obtained from the matrix 1700 similarly to the synchronizing merge structure 2000 discussed previously, the determination of the values for insertion in the newly generated row is not based on conjunction of the incoming paths, but may instead be based on a function as indicated by the entries in Table II.

Thus, matrix entries included in a matrix 1700 row associated with an outgoing or exiting path may be set to "true" or "false" only if the corresponding values are respectively all "true" or all "false" for every path. All differing values may be regarded as erroneous. Thus, paths which are directly connected to either an exclusive choice, or a deferred choice split, may always need to share the "true" values, due to the nature of the split structure. If the values of the paths differ, it may be inferred that the process model is not modeled consistently, in that it may be impermissible to merge a path that is either directly or indirectly connected to a parallel split structure with an exclusive choice merge structure. For example, such a merge may not be allowed by example workflow languages such as Business Process Modeling Notation (BPMN), Event-driven Process Chain (EPC), or Unified Modeling Language (UML). In Table II, such erroneous cases are indicated by table entries indicating "error" values. Thus, according to an example embodiment, it may be possible to advantageously identify this specific modeling error.

TABLE II

| XOR | False | True |
|---|---|---|
| False | 0 | Error |
| True | Error | 1 |

Therefore, according to an example embodiment, when an exclusive choice merge structure is reached in a traversal: 1) the matrix 1700 may be extended with the IDs of the outgoing or exiting paths; 2) matrix values may be set to "false" for matrix entries wherein the x and y index values associated with the entries are equal and both index values are equal to the new path IDs; 3) all incoming paths' values may be merged as indicated by the values stored in Table II and the corresponding values may be inserted into the matrix 1700 in the added row; and 4) the new row values may be inserted in the new columns based on the symmetrical aspects of the matrix 1700 discussed previously.

The matrix 1700 that may be generated based on example techniques discussed previously serve as a tool in determining which path needs to be checked against which other paths in determinations of process model validity, as discussed below. According to an example embodiment, a parallel split validation may be performed based on a complete matrix 1700 that describes all paths included in a closed split structure, and on the lists generated for every path, indicating all preconditions and postconditions for each respective path. According to an example embodiment, Table III shown below may indicate items that may need to be checked or not. As discussed previously, validation may be based on literals. These literals may be retrieved from the activities that may be located inside a closed parallel split structure. All of these literals may be stored such that they may be traced to paths that include the activities from which the literals were derived. The literals may be retrieved from the activities by machine reasoning based on the semantic information that represents the specific literal.

TABLE III

| Path A ($P_A$)/ Path B ($P_B$) | Precondition | Postcondition |
|---|---|---|
| Precondition | No Check | $L \in P_A \wedge \neg L \in P_B$ |
| Postcondition | $L \in P_A \wedge \neg L \in P_B$ | $L \in P_A \wedge L \in P_B$ |
| | | $L \in P_A \wedge \neg L \in P_B$ |

According to an example embodiment, Table III illustrates which literals may need to be checked against each other. As shown in Table III, literals shown on the left side of an equation may all be included in one path and literals on the right side (e.g., after the "Λ" structure) may be included in another path. The following four statements may explain the entries of Table III:

1. It is not necessary to check the precondition literals of one path against the precondition literals of another path.
2. It may need to be determined whether the postcondition literals of one path are conflicting with the preconditions of another path. In other words, it is not permissible that an activity may negate the precondition of another activity that is intended to be executed concurrently. This check may need to be performed, for example, because it is unknown whether the fact that is stated to be a precondition of service A will be negated by another web service B that is executed in parallel before A is actually enacted. If this happens, A may not be enacted further because its precondition was negated previously.
3. It may need to be determined whether two web services that are executed in parallel on different paths may have the same outcome, i.e., either the same literal is false or the same literal is true. For example, upon reaching a merge structure, there may be two literals of the same kind, and no knowledge of whether this is desired. Thus, for example, a warning may be issued, so that a modeler of a business process model may determine whether the behavior of the two activities with the same outcome is desired, or whether it is a mistake.
4. Postconditions of web services designed to be executed in parallel on different paths may not be allowed to produce conflicting literals in their postconditions, for this may lead to an ambiguous situation in which a literal may be determined to be simultaneously true and false.

According to an example embodiment, actual checks may be performed by reasoning techniques. According to an example embodiment, a tool using techniques discussed herein for the points 1, 2, and 4 in the previous list may produce an error message, stating what services on which paths are conflicting and why. When discovering a conflict as discussed in point 3 of the list, a warning may be generated, also stating which paths and specific services may need further investigation.

According to an example embodiment, the matrix 1700 may be used in performing the checks. Thus, every row may be checked. The checks may be performed using the lists that have been generated for the specific path that is tagged with the row ID. For every field in this row having a value of "true," the path having the same ID as the x-axis value for that field may be checked for the previously depicted errors.

According to an example embodiment, a process model that includes one or more closed parallel split structures may be checked for validity. For example, a process model may include two or more parallel split structures that both are depicted in a logical sequence, one being closed before another occurs in the logical sequence. As discussed previously, the matrix 1700 may be generated when the example modified depth-first search technique used to traverse the process model reaches or visits a first parallel split structure. When the example modified depth-first search technique reaches a point wherein the first parallel split structure is closed (e.g., all paths included in the first parallel split structure, connected either directly or indirectly, have been merged), the generated matrix 1700 may not be needed any more, and may be discarded. Thus, when the example modified depth-first search algorithm reaches a next split structure, a new matrix 1700 may be generated. However, according to an example embodiment, the matrix 1700 may be extended further.

Figure 22B:
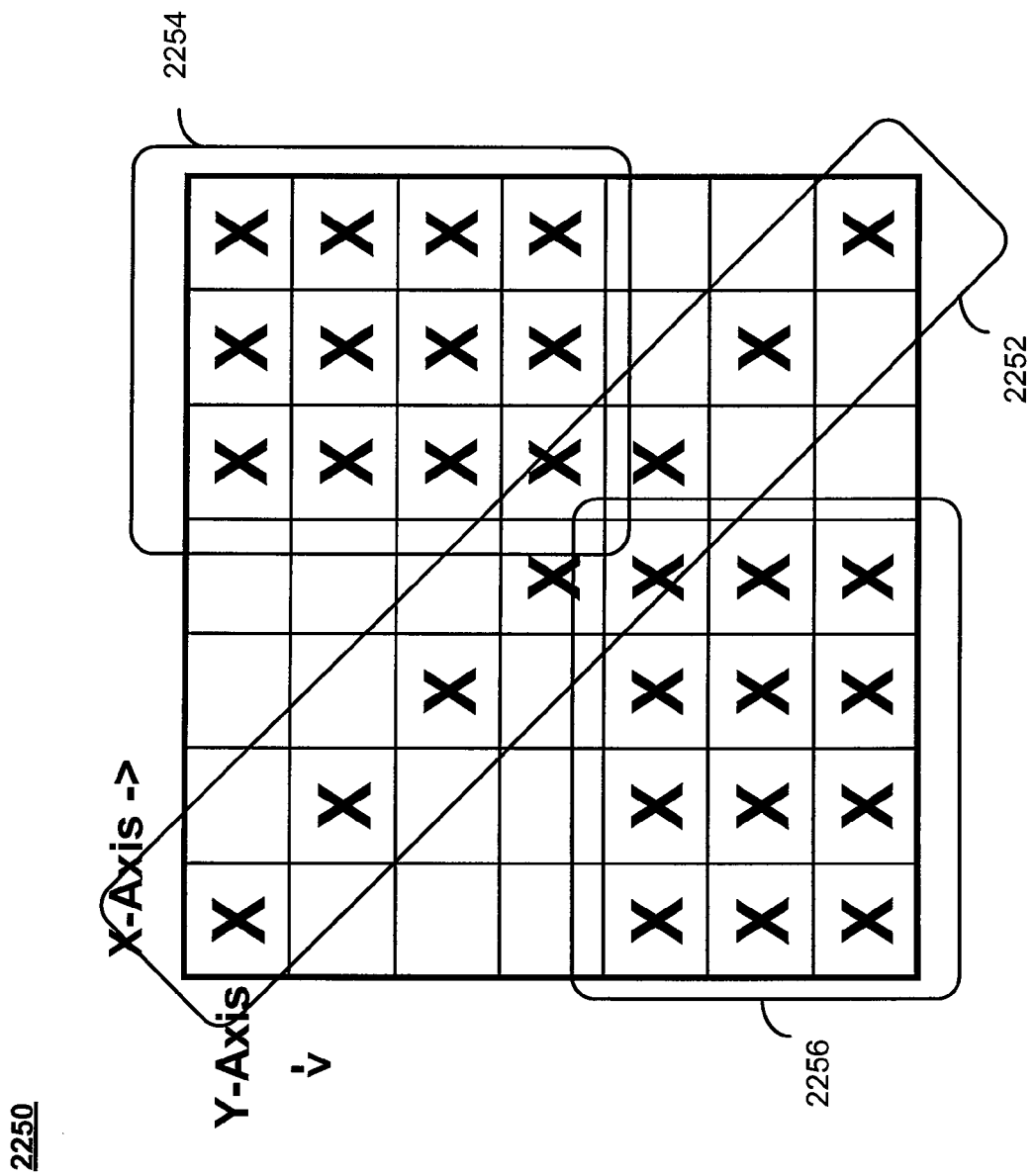

For example, FIGS. 22a-22b illustrate the matrix depicted in FIG. 17 extended with new paths according to an example embodiment. According to an example embodiment, an extension of an already existing matrix 1700 may indicate that all fields connected to the IDs of the paths that were added during the traversal of the first parallel split are filled with "false" values. Therefore, the extended matrix shown in FIGS. 22a-22b may not need to consider those fields, thus advantageously saving processing time in the extended traversal, according to an example embodiment. FIG. 22b illustrates a main diagonal 2252, an area 2254 above the main diagonal 2252, and an area 2256 below the main diagonal 2254. As shown in the example of FIG. 22b, entries above and below the main diagonal 2252 may mirror each other, in accordance with symmetry of matrix entries associated with symmetric matrices.

Figure 23:
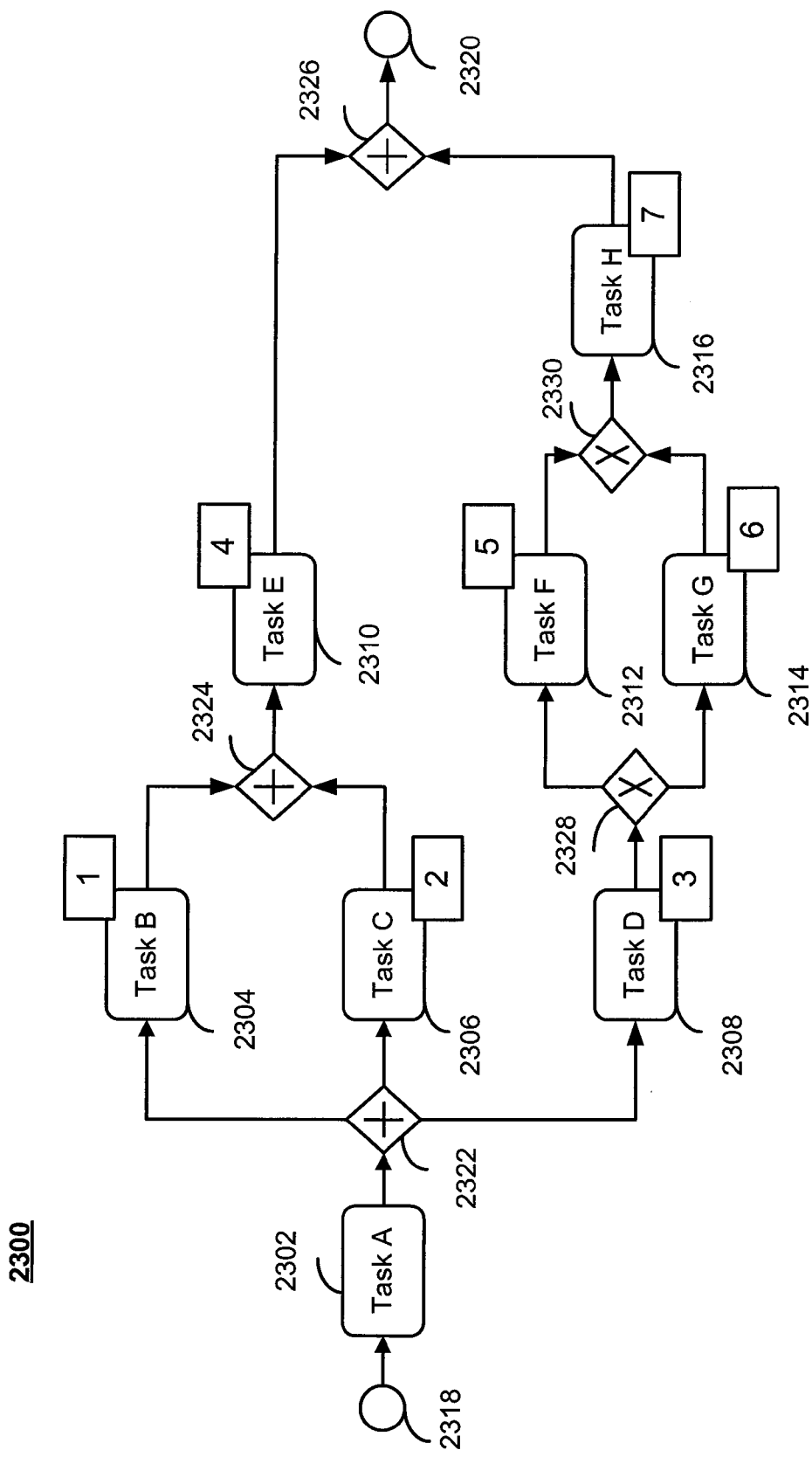
FIG. 23 illustrates a process model for traversal and validation according to an example embodiment.

FIG. 23 illustrates a process model 2300 for traversal and validation according to an example embodiment. For example, a business expert may generate the process model 2300 based on the Business Process Modeling Notation (BPMN) language. For purposes of illustration, the paths included in FIG. 23 are already assigned path IDs 1-7, thus indicating an order in which they are traversed by an example modified depth-first search technique as discussed previously.

As shown in the example of FIG. 23, tasks may be traversed in an ordering indicted as task A 2202, task B 2204, task C 2206, task D 2208, task E 2210, task F 2212, task G 2214, and task H 2216. As shown in the example of FIG. 23, an initial start event 2218 may precede task A 2202, and an end event 2220 may indicate an exit from the process model 2300. As shown in the example of FIG. 23, the tasks 2202-2216 may be connected via join and merge structures 2222, 2224, 2226, 2228, and 2230.

According to an example embodiment, an ID value of 0 and 8 may be assigned to the start event 2218, and an ID value of 8 may be assigned to the end event 2226 (not shown. As shown in the example of FIG. 23, every path includes only one activity; however, it is also possible that example paths may include no activities or an arbitrary number of activities.

According to an example embodiment, every activity may be replaced by a corresponding web service that reflects the functionality of the replaced activity. For purposes of illustration, a semantic representation of the process model 2300 may be obtained, and a parallel validation check may be performed.

Figures 24, 25:
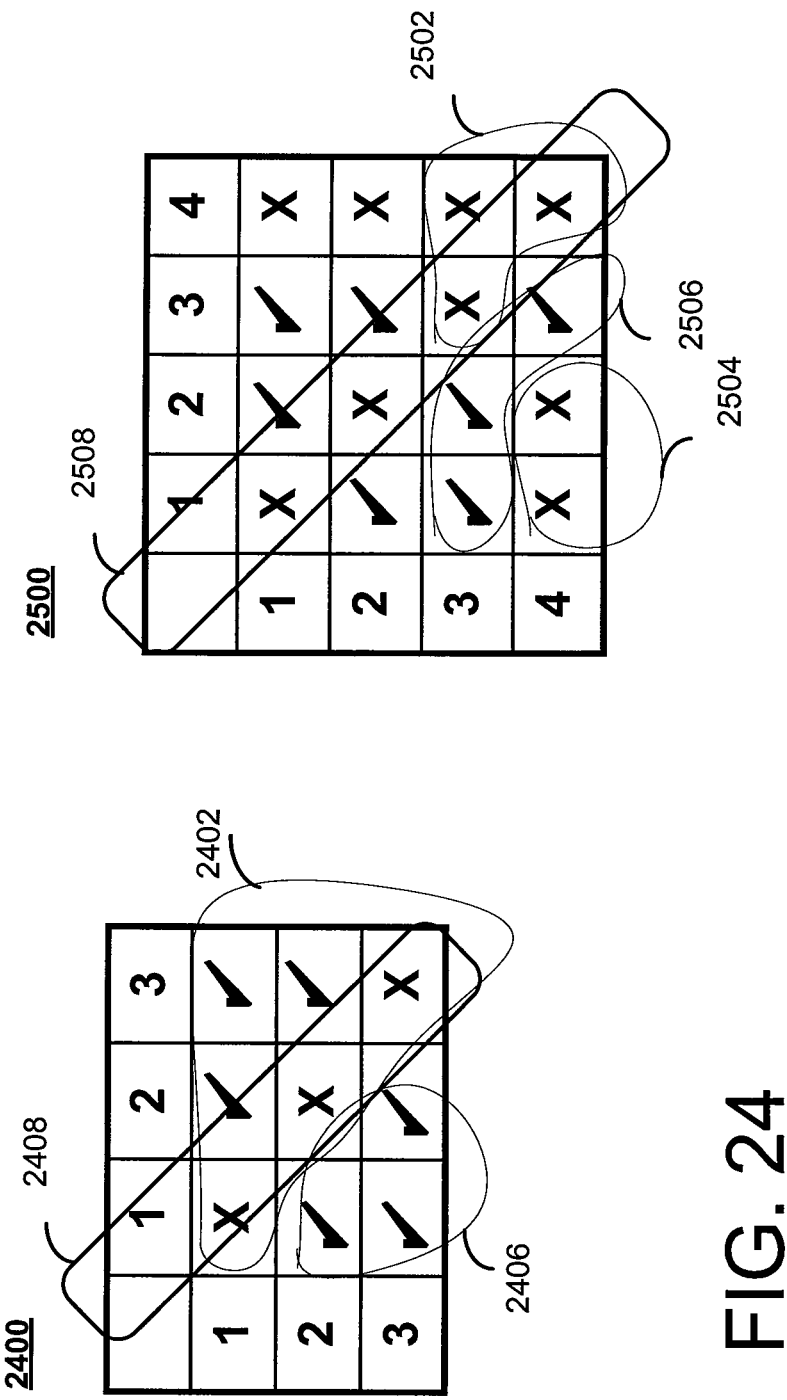
FIGS. 24-25 depict results of matrix operations that may be performed during an enumeration of the process model of FIG. 23.

FIGS. 24-25 depict results of matrix operations that may be performed during an enumeration of the process model of FIG. 23. For example, areas 2202 and 2502 indicate that fields have been added later, such that their values have been determined via mirroring corresponding row values. For example, "X" values representing "false" values in area 2504 and check indicators indicating "true" values in areas 2406, 2506 are determined while generating the matrix 2400, 2500. For example, matrix diagonals 2408, 2508 may indicate that all values above the diagonals 2408, 2508 may be automatically set, either by determining that that no paths need to be checked with each other, or based on mirroring row values.

As discussed previously, checking may be initiated when the example traversal technique reaches a first parallel split structure. Therefore, thus a path exiting the start event 2218 may not be considered in the discussion below.

According to an example embodiment, as a first step, the parallel split structure 2222 may be visited, the matrix 2400 may be generated, and all paths exiting the parallel split structure 2222 may be added to the matrix 2400. Thus, exiting paths 1, 2, and 3 may be added to the matrix 2400. As shown in the example of FIGS. 24-25, the check indicators shown in areas 2406 may indicate that all paths may be checked against each other. The check indicators shown in the fields above the diagonal 2408 are added by mirroring the row values, as discussed previously.

According to an example embodiment, as a second step, the modified depth-first search technique may traverse the paths 1 and 2 associated with the tasks 2204 and 2206, and the preconditions and postconditions of the corresponding services are obtained and stored. The parallel merge structure 2224 may be visited a first time with regard to the path 1 associated with the task B 2204, and a second time with regard to the path 2 associated with the task C 2206. When the parallel merge structure 2224 is visited the second time, path 4 may be added to the matrix, as shown in FIG. 25. According to an example embodiment, since the paths 1 and 2 occur prior to path 4 in the traversal, they will not be checked. According to an example embodiment, the conjunction of the paths may be determined as discussed previously, and the values may be added to the matrix 2500.

According to an example embodiment, as a third step, the modified depth-first search technique may traverse path 4 to reach another parallel merge structure 2226, which may indicate a closing of the initial split structures 2222, 2228. However, since not all incoming paths (e.g., paths 4 and 7) of the final merge structure 2226 have been traversed, the modified depth first search technique may back up to the split structure 2222, and path 3 may be traversed. Upon reaching the choice split structure 2228, the two exiting paths 5 and 6 may be added to the matrix 2500.

Figures 26, 27:
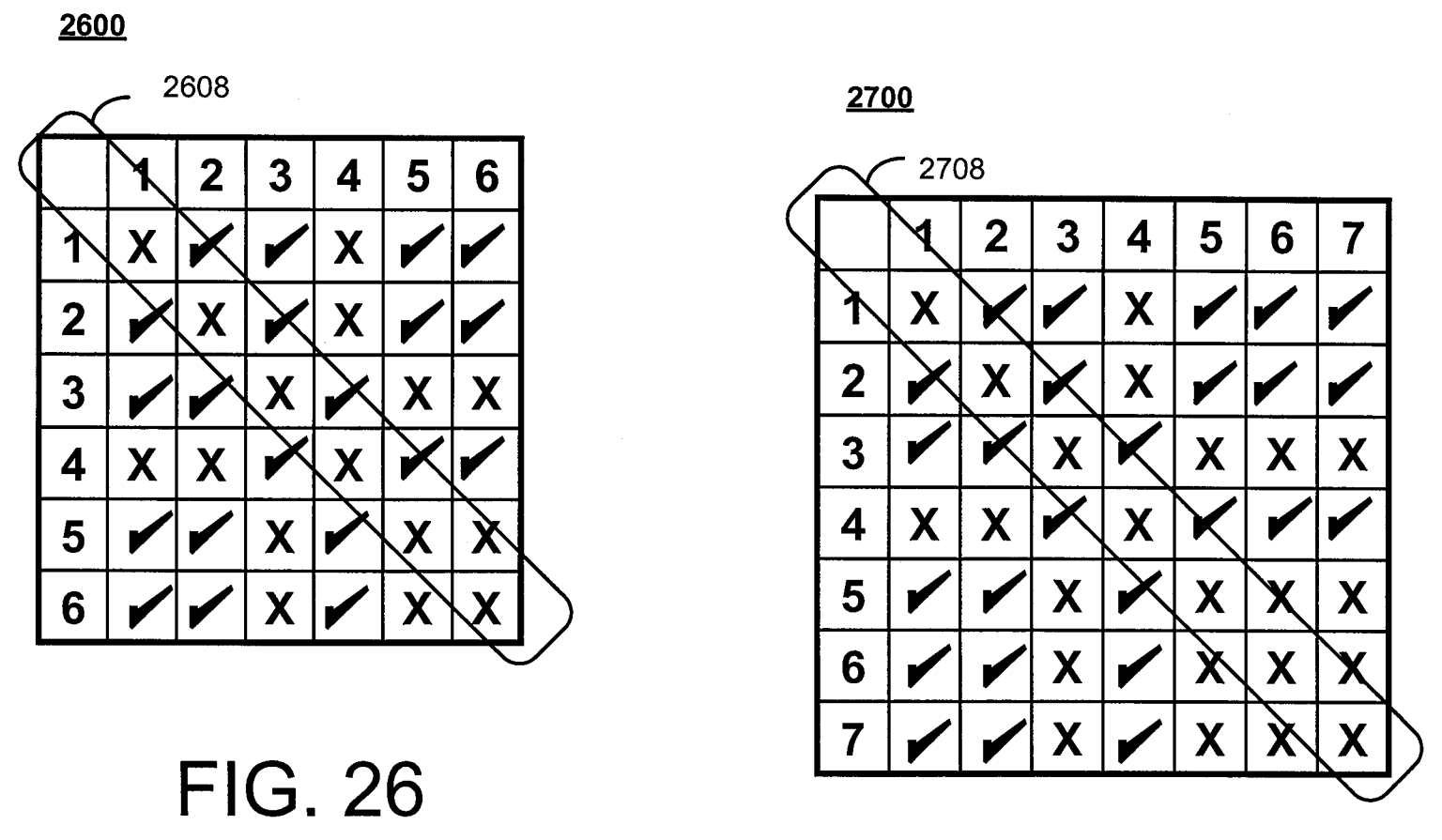

FIG. 26 illustrates the matrix of FIG. 25 with new rows added according to an example embodiment. Thus, in the example of FIG. 26, the new paths may be depicted with path ID values 5 and 6 in matrix 2600. The matrix 2600, including a diagonal 2608, may be filled with values as discussed previously with regard to the choice split structure as shown in FIG. 19. According to an example embodiment, the values of line 3 of the matrix 2500 may be copied and the value in row 6, column 5 of the matrix 2600 may be set to "false" to indicate that choice paths do not need to be checked against each other.

According to an example embodiment, as a fourth step, the modified depth-first search technique may traverse and tag path 7 as an exiting path from the merge structure 2230 shown in FIG. 23. FIG. 27 illustrates the matrix of FIG. 26 with a new row added according to an example embodiment. Thus, row 7 may be added to the matrix 2600, as shown in a matrix 2700 of FIG. 27. The values of the path 7 may be determined based on generating the new values in accordance with Table II discussed previously, using rows 5 and 6. Since paths 5 and 6 have identical values for each field in this example, no error may be determined. When processing of path 7 is completed, the merge structure 2226 may be traversed a second time. At this point, since all incoming paths to the final merge structure 2226 have been traversed, no further enumeration is needed, according to an example embodiment.

At the completion of the traversal discussed above, paths needing to be checked with one another may be indicated by entries in the matrix 2700 as shown in FIG. 27. Thus, according to an example embodiment, checking techniques may be performed based on the matrix 2700, including a diagonal 2708, as discussed previously.

According to an example embodiment, a start state may be generated if none is provided by an initial process model needing validation. Since validation may be needed at design time, it is possible that there is no starting information available. In other words, there may be no facts that are known by the time the first task in a process model may be validated. However, this data may be needed to fulfill preconditions of activities within a process model which are not produced by postconditions of preceding activities. For example, since a business expert designing a business process model may not able to specify the needed information, a start state may be generated automatically as discussed below.

According to an example embodiment, a start state may have the same characteristics as a "normal" state, i.e., it may store and represent information similarly to other states of the process model. Therefore, the start state may include a first state within a process model which is connected to the outgoing or exiting connector of a start event structure. This example start state may include all information, respectively literals, that may be true before the validation of the first activity is performed.

In order to generate a start state, all information may be needed that is not produced by the activities that may be depicted in a process model but that may be needed in order to fulfill their preconditions. For example, a business process model may include of a sequence with three tasks. For example, these tasks may include the tasks depicted with regard to FIGS. 11 and 12 discussed previously, including the same preconditions 1108, 1110, 1112 and postconditions 1114, 1116, 1118, except for task C 1106, for which the precondition 1112 may be changed from including "locationIsX" to including "locationIsY" so that the process model has no apparent flaws.

FIG. 28 depicts a table 2800 illustrating preconditions 2802 and postconditions 2804 associated with the sequence structure of FIG. 11 according to an example embodiment. As shown in the example of FIG. 28, information that may be implicitly needed for execution of the sequence structure 1100 may be determined (i.e. information regarding what needs to be true in order to execute the tasks 1102, 1104, 1106 of FIG. 11). Thus, for this example, the facts "car available" and "locationIsX" may be determined. If this information is not available in the start state of a process model, the sequence 1100 may not be executed because the preconditions of task A 1102 and task B 1104 may not be known, may not be generated based on postconditions of any preceding tasks, and thus may not be available in the preceding states. As discussed below, information that may be needed for proper execution may be determined automatically, according to an example embodiment.

According to an example embodiment, a determination of a start state may need to include checking every activity for fulfilled precondition literals. Thus, every path of the process model for which this state needs to be determined, may need to be to be traversed, and thus, every depicted activity may need consideration. According to an example embodiment, the modified depth-first search technique discussed previously may be used to perform these tasks.

Result states may be generated based on activity postconditions and these states may then be added to the exiting path of the corresponding activity as discussed previously. However, according to an example embodiment, two different kinds of states may be used for generating a start state. For example, one different state may include the start state, which may only be updated as it is determined that new precondition information may be needed. For example, another different type of state may include "regular" states, which may be used to determine what information is available by the time an activity is scheduled to be executed in a process model.

According to an example embodiment, the start state may be connected to the first edge in a process model, which may be connected to the start event. According to an example embodiment, the a "regular" state may include the information of the start state and may be updated and stored in association with the respective connectors with every postcondition that may be added during the traversal of the process model.

According to an example embodiment, traversal of the process model may include techniques as discussed below. As a start state generation technique is initiated, no information may be known, and the state connected to the first connector may be empty. The process model may be traversed until a first activity is reached.

According to an example embodiment, the start state generation technique may then determine whether the activity has all preconditions fulfilled. If so, the start state generation technique may continue, as the postcondition of the activity may be used to generate the following state as discussed previously, and the generated state may be added to the exiting path of the respective activity.

If the precondition information of the activity is not included in the preceding state, it may be added to the start state such that all literals of the precondition which are not yet indicated by the start state and which are not conflicting may be used to update the start state. The process model traversal may then proceed, considering the new start state, and continuing, as previously discussed, as described until every activity is traversed.

According to an example embodiment, conflicts may be determined when updating the start state information during the creation technique discussed above. For example, an inconsistency may be determined when a task includes a particular precondition literal, wherein the preceding state includes the same literal except in a negated form. For example literal (A) may be indicated as needed in a precondition, and literal (NOT A) may be stored in the preceding state. Thus, some activity that was executed before the currently checked activity, may negate the precondition. Therefore, no matter which information may be provided in the start state, the activity under consideration may never be enacted.

As another example, an inconsistency may be determined when a task includes a particular precondition literal, wherein the start state includes the same literal, but the literal is not included in the preceding state. For example, a choice merge structure may occur in the process model before the current task, as literals that may be indicated in states connected to incoming links may not be not considered in successive states.

As another example, a task may include a particular precondition literal, wherein the negated literal may already be included in the start state, but may not be indicated in the preceding state. Thus, another activity may have already needed the literal in its negated form for a precondition associated with the other activity. In this case, adding the literal to the start state may lead to a situation in which the literal may be true in any case, implying that any changes to this literal that may be made by successive activities may have no effect.

According to an example embodiment, a literal may be added to the start state, if it is included in a precondition, is not obtained in the previous state and is also not obtained in the start state. According to an example embodiment, automatic generation of a start state for a specific process model may include the same checks and may use the same techniques as discussed previously with regard to validation techniques for the process model. According to an example embodiment, the validation techniques may be enhanced by the creation of the start state. According to an example embodiment, either the validation approach discussed with regard to validation of the process model, or the start state computation approach discussed above may be used for logical sequence validation. The former may to be used when no start state information is available, and the latter if start state information is provided, for example, by a business expert who may have designed the process.

According to an example embodiment, an executable task may depict a task such that whenever a process instance tries to execute the task, its preconditions are fulfilled. Thus, the process may imply that the facts in the precondition are always fulfilled, e.g., by always executing some other task before the task at hand, and this other task's effect includes the facts needed for execution. The absence of precondition or effect conflicts in turn may be related to tasks which may be executed in parallel to some particular task. For example, one task may require a valid contract, while another task which may be potentially executed in parallel may cancel the customer's contract, thus causing a precondition conflict. Example techniques discussed herein detect such a situation based on preconditions, effects, and the control flow structure of the process.

Example techniques discussed herein may build on algorithms which propagate knowledge over a process graph. For example, for conflict detection, information regarding which tasks may be executed in parallel to which other tasks may be derived from a pass through the process model, during which a matrix may be constructed, as discussed previously. After processing an example matrix propagation technique, the matrix may indicate which tasks are parallel to which other tasks, as discussed previously. According to an example embodiment, conflicts may then be detected by checking whether the preconditions and effects of a given task overlap with the preconditions and effects of a parallel task. Additionally, by making a pass over the process graph, the I-propagation algorithm may determine which facts may be true in any case in which a given task may be executed. Thus, the intersection of the facts which may be true in all the states which may lead to the execution of a given task. If the precondition only requires facts which are included in this intersection, then the task may be considered executable.

According to an example embodiment, a basic I-propagation technique may not consider situations that include parallel structures and negative effects. For example, if a task node in a parallel structure negates a previously existing literal, then an example basic I-propagation technique may not generate a basis for executability checking of task nodes.

According to an example embodiment, a propagation technique may overcome such a limitation by using the matrix techniques discussed previously. According to an example embodiment, the propagation may be similar to the example I-propagation techniques except for situations in which a pre-existing literal may be negated.

Figure 29:
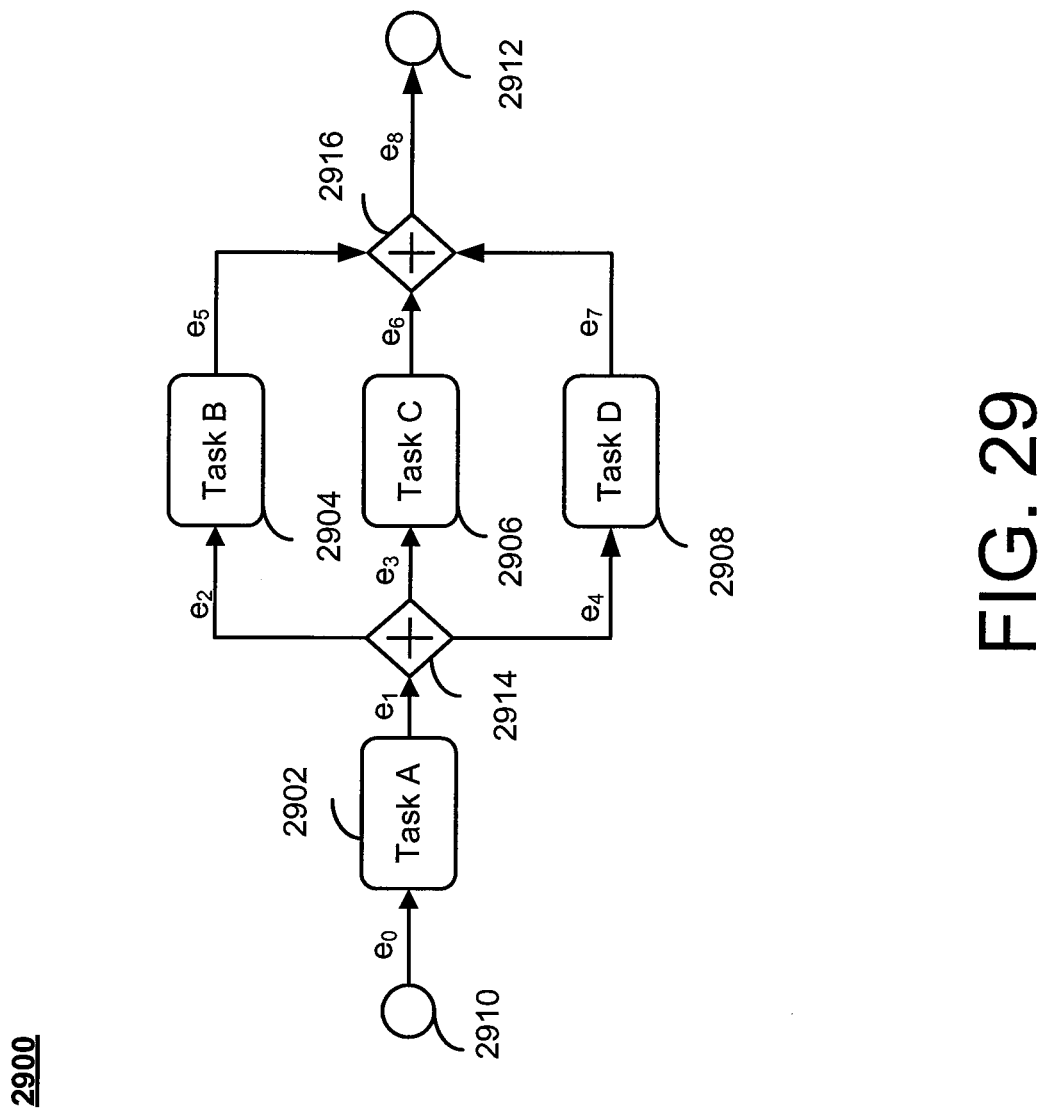
FIG. 29 depicts an example parallel structure.

FIG. 29 depicts an example parallel structure 2900. As shown in the example of FIG. 29, a node A 2902 may be associated with a Task A. Similarly, node B 2904, node C 2906, and node D 2908 may be associated with Tasks B, C, and D, respectively. As shown in the example of FIG. 29, an initial start event 2910 may precede task A 2902, and an end event 2912 may indicate an exit from the process model 2900. As shown in the example of FIG. 29, the tasks 2902-2908 may be connected via join and merge structures 2914 and 2916, and by edges $e_0$, $e_1$, $e_2$, $e_3$, $e_4$, $e_5$, $e_6$, $e_7$, and $e_8$.

If $l \in \text{eff}(\text{node A})$ depicts a literal caused by node A 2902, or the node associated with task A, then an I-propagation over node A 2902 and a parallel split 2914 may result in $l \in I(e_1)$, $l \in I(e_2)$, $l \in I(e_3)$, $l \in I(e_4)$, wherein $I(e_i)$ denotes a set of literals to which an edge $e_i$ is mapped by the I-propagation. As an example, l may not appear in the precondition or effect of node B 2904, or the node associated with task B, so the I-propagation over node B 2904 may add l to $I(e_5)$. Further, for example, l may be negated by node C 2906: $\neg l \in \text{eff}(\text{node C } \mathbf{2906})$. If $\neg l \notin \text{eff}(\text{node D } \mathbf{2908})$, then $\neg l$ may be added to $I(e_6)$ and l may be removed from $I(e_2)$, $I(e_4)$, and $I(e5)$. The I-propagation over node D 2908 and the parallel join 2916 may then result in $I(e_7)$ not mentioning l, but $\neg l \in I(e_8)$.

As a further example, if $\neg l \in \text{eff}(\text{node D } \mathbf{2908})$, then $\neg l$ may be added to $I(e_6)$ and l may be removed from $I(e_2)$, $I(e_4)$, and $I(e_5)$ as above, and l may also be removed from $I(e_3)$, as $I(e_3)$ may capture all literals that must be true while there is a token on $e_3$. However, with $\neg l \in \text{eff}(\text{node D } \mathbf{2908})$ and $n_4 \|_t n_5$ there exists a state where l has been removed by node D 2908 before node C 2906 consumed a token on $e_3$. Therefore, neither l nor the negation of l may appear in $I(e_3)$. Thus, if l is not removed on $I(e_3)$ but on $I(e_4)$, the I-propagation over node D 2908 may not notice that l had to be removed from $I(e_3)$, because the l would not be on $I(\text{IN}(\text{node D } \mathbf{2908}))$, wherein IN(node) depicts the set of input edges associated with a node. This example thus considers edges which may not be "parallel" to a node n under consideration, but may be "parallel" to some other node $n_0$ which is token-parallel to n. The I-propagation over node D 2908 and the parallel join 2916 may then result in $\neg l \in I(e_7)$ and $\neg l \in I(e_8)$.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system including instructions recorded on a non-transitory computer-readable storage medium and executable by at least one processor, the system comprising:
   a process semantic model validation engine including:
      a semantic model input manager configured to cause the at least one processor to obtain a process semantic model including a semantic directed graph including nodes associated with tasks and edges associated with a direction of flow of execution of the tasks, wherein edges entering nodes include preconditions including precondition semantic indicators associated with the edges entering the nodes, wherein edges exiting nodes include postconditions including postcondition semantic indicators associated with the edges exiting the nodes, the process semantic model being associated with semantic web services, each precondition including one or more logical expressions to be evaluated to determine whether an activity associated with a node can be started, each postcondition including one or more logical expressions to be evaluated to determine whether the activity associated with the node can be completed;
      a semantic model traversal manager configured to cause the at least one processor to traverse the process semantic model to determine a flow of execution of activities associated with the tasks based on visiting the nodes based on a depth-first traversal, wherein each of the activities is a web service; and a semantic model validity manager configured to cause the at least one processor to determine a validity of execution associated with a flow of execution of the activities associated with the tasks based on checking a validity of execution status based on a semantic processing of one or more semantic annotation indicators associated with the precondition semantic indicators and the postcondition semantic indicators, wherein the semantic model traversal manager is further configured to cause the at least one processor to:
  determine a checking indicator indicating a checking relationship between each traversed path and previously traversed paths included in workflow structures included in the semantic directed graph, wherein each traversed path and each previously traversed path includes one or more nodes included in the semantic directed graph,
  for each traversed path, generate a list of semantic annotation indicators associated with the precondition semantic indicators and the postcondition indicators associated with the each traversed path, the list of semantic annotation indicators including a list of the logical expressions from the preconditions and postconditions belonging to a respective traversed path, and
  store the checking indicators in a matrix that includes rows associated with the paths included in the workflow structures included in the semantic directed graph; and
wherein the semantic model validity manager is further configured to cause the at least one processor to determine the validity of execution based on determining the validity of execution associated with a flow of execution of the activities associated with the tasks based on checking a validity of execution status based on the checking indicators stored in the matrix and a semantic processing of the list of the logical expressions of the preconditions and the postconditions for one or more traversed paths.

2. The system of claim 1 further comprising:
a process semantic model repository configured to store information associated with process semantic models.

3. The system of claim 1 wherein the workflow structures include one or more of a parallel execution workflow structure, a sequential execution workflow structure, a split execution workflow structure, or a merge execution structure.

4. The system of claim 1 wherein each one of the paths includes a logical sequence of a group of the activities and a list of semantic indicators associated with the preconditions and the postconditions associated with the group of activities.

5. The system of claim 1 wherein the semantic model validity manager further comprises:
a structure analysis engine configured to determine that a first and second one of the nodes are included in a parallel execution structure included in the workflow structures,
a semantic precondition analysis engine configured to determine, for the first one of the nodes, whether first precondition semantic indicators associated with a first edge entering the first one indicate one or more positive values indicating a positive validity of execution of activities associated with the tasks associated with the first one,
a semantic postcondition analysis engine configured to determine, for the second one of the nodes, whether first postcondition semantic indicators associated with a second edge exiting the second one indicate one or more positive values indicating a positive validity of execution of activities associated with the tasks associated with the second one, and
a parallel execution engine configured to determine a validity of parallel execution of tasks included in the parallel execution structure based on results determined by the semantic precondition analysis engine and the semantic postcondition analysis engine.

6. The system of claim 1 wherein the semantic model validity manager further comprises:
a semantic precondition analysis engine configured to determine, for a first one of the nodes, whether first precondition semantic indicators associated with a first edge entering the first one indicate one or more positive values indicating a positive validity of execution of activities associated with the tasks associated with the first one.

7. The system of claim 1 wherein the semantic model validity manager further comprises:
a semantic inconsistency analysis engine configured to determine one or more semantic inconsistencies associated with a flow of execution of the activities associated with the tasks based on the traversing the process semantic model.

8. A computer-implemented method for causing at least one processor to execute instructions recorded on a non-transitory computer-readable storage medium, the method comprising:
  obtaining, by at least one processor, a process semantic model including a semantic directed graph including nodes associated with tasks and edges associated with a direction of flow of execution of the tasks, wherein edges entering nodes include preconditions including precondition semantic indicators associated with the edges entering the nodes, wherein edges exiting nodes include postconditions including postcondition semantic indicators associated with the edges exiting the nodes, the process semantic model being associated with web services including semantic web services, each precondition including one or more logical expressions to be evaluated to determine whether an activity associated with a node can be started, each postcondition including one or more logical expressions to be evaluated to determine whether the activity associated with the node can be completed;
  traversing, by the at least one processor, the process semantic model to determine a flow of execution of activities associated with the tasks based on visiting the nodes based on a depth-first traversal, wherein each of the activities is a web service; and
  determining, by the at least one processor, a validity of execution associated with a flow of execution of the activities associated with the tasks based on checking a validity of execution status based on a semantic processing of one or more semantic annotation indicators associated with the precondition semantic indicators and the postcondition semantic indicators, wherein:
  traversing, by the at least one processor, the process semantic model includes traversing the process semantic model to determine a flow of execution of activities associated with the tasks based on visiting the nodes based on a depth-first traversal, the traversing the process semantic model including:
    determining a checking indicator indicating a checking relationship between each traversed path and previously traversed paths included in workflow structures included in the semantic directed graph, wherein each traversed path and each previously traversed path includes one or more nodes included in the semantic directed graph, for each traversed path, generating a list of semantic annotation indicators associated with the precondition semantic indicators and the post condition indicators associated with the each traversed path, the list of semantic annotation indicators including a list of the logical expressions from the preconditions and postconditions belonging to a respective traversed path, and storing the checking indicators in a matrix that includes rows associated with the paths included in the workflow structures included in the semantic directed graph; and determining, by the at least one processor, the validity of execution includes determining the validity of execution associated with a flow of execution of the activities associated with the tasks based on checking a validity of execution status based on the checking indicators stored in the matrix and a semantic processing of the list of the logical expressions of the preconditions and the postconditions for one or more traversed path.

9. The method of claim 8 wherein the workflow structures include one or more of a parallel execution workflow structure, a sequential execution workflow structure, a split execution workflow structure, or a merge execution structure.

10. The method of claim 8 wherein each one of the paths includes a logical sequence of a group of the activities and a list of semantic indicators associated with the preconditions and the postconditions associated with the group of activities.

11. A computer program product being tangibly embodied on a non-transitory computer-readable storage medium and being configured to cause a data processing apparatus to:

obtain a process semantic model including a semantic directed graph including nodes associated with tasks and edges associated with a direction of flow of execution of the tasks, wherein edges entering nodes include preconditions including precondition semantic indicators associated with the edges entering the nodes, wherein edges exiting nodes include postconditions including postcondition semantic indicators associated with the edges exiting the nodes, the process semantic model being associated with web services including semantic web services, each precondition including one or more logical expressions to be evaluated to determine whether an activity associated with a node can be started, each postcondition including one or more logical expressions to be evaluated to determine whether the activity associated with the node can be completed;

traverse the process semantic model to determine a flow of execution of activities associated with the tasks based on visiting the nodes based on a depth-first traversal, wherein each of the activities is a web service; and determine a validity of execution associated with a flow of execution of the activities associated with the tasks based on checking a validity of execution status based on a semantic processing of one or more semantic annotation indicators associated with the precondition semantic indicators and the postcondition semantic indicators, wherein:

the data processing apparatus is further caused to traverse the process semantic model to determine a flow of execution of activities associated with the tasks based on visiting the nodes based on a depth-first traversal, including:

determine a checking indicator indicating a checking relationship between each traversed path and previously traversed paths included in workflow structures included in the semantic directed graph, wherein each traversed path and each previously traversed path includes one or more nodes included in the semantic directed graph, for each traversed path, generate a list of semantic annotation indicators associated with the precondition semantic indicators and the post condition indicators associated with the each traversed path, the list of semantic annotation indicators including a list of the logical expressions from the preconditions and postconditions belonging to a respective traversed path, and store the checking indicator in a matrix that includes rows associated with the paths included in the workflow structures included in the semantic directed graph; and determine the validity of execution associated with a flow of execution of the activities associated with the tasks based on checking a validity of execution status based on the checking indicators stored in the matrix and a semantic processing of the list of the logical expressions of the preconditions and the postconditions for one or more traversed paths.

\* \* \* \* \*